(12) United States Patent
Anvaripour et al.

(10) Patent No.: US 11,265,274 B1
(45) Date of Patent: Mar. 1, 2022

(54) ACCESS AND ROUTING OF INTERACTIVE MESSAGES

(71) Applicant: Snap Inc., Santa Monica, CA (US)

(72) Inventors: Kaveh Anvaripour, Santa Monica, CA (US); Grygoriy Kozhemiak, Odesa (UA); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 180 days.

(21) Appl. No.: 16/804,774

(22) Filed: Feb. 28, 2020

(51) Int. Cl.
*H04L 12/58* (2006.01)
*H04L 29/12* (2006.01)
*H04L 51/10* (2022.01)
*H04L 51/52* (2022.01)
*H04L 51/18* (2022.01)

(52) U.S. Cl.
CPC .............. *H04L 51/10* (2013.01); *H04L 51/18* (2013.01); *H04L 51/32* (2013.01)

(58) Field of Classification Search
CPC ................................ H04L 51/10; H04L 51/18
See application file for complete search history.

(56) References Cited

U.S. PATENT DOCUMENTS

| | | | |
|---|---|---|---|
| 7,865,394 B1 | 1/2011 | Calloway et al. |
| 8,595,757 B2 | 11/2013 | White et al. |
| 8,887,189 B2 | 11/2014 | Beyabani |
| 9,166,939 B2 | 10/2015 | Rasmussen et al. |
| 9,185,348 B2 | 11/2015 | Choi et al. |
| 9,300,835 B2 | 3/2016 | Jalkanen et al. |
| 9,314,692 B2 | 4/2016 | Konoplev et al. |
| 9,553,841 B1 | 1/2017 | Skinner et al. |
| 10,115,139 B2 | 10/2018 | High et al. |
| 10,205,697 B2 | 2/2019 | Skinner et al. |

(Continued)

FOREIGN PATENT DOCUMENTS

| | | |
|---|---|---|
| EP | 2779633 | 9/2014 |
| WO | 2015189606 | 12/2015 |

(Continued)

OTHER PUBLICATIONS

"U.S. Appl. No. 16/368,037, Response filed Jun. 30, 2020 to Non Final Office Action dated Apr. 1, 2020", 13 pgs.

(Continued)

*Primary Examiner* — Suraj M Joshi
(74) *Attorney, Agent, or Firm* — Schwegman Lundberg & Woessner, P.A.

(57) ABSTRACT

Systems and methods are provided for determining that a message received from a second computing device associated with a second user is an interactive message and causing the interactive message to be displayed. In response to a selection to skip engagement with the interactive message, the systems and methods display a message feed with a list of a plurality of users and cause a selectable engagement indicium to be displayed next to a list entry of the second user in the list. The system and methods further determine that a predetermined amount of time has elapsed since the start time of the display of the interactive message without engagement with the interactive message and cause the interactive message to be deleted from the message feed and the selectable engagement indicium removed from next to the list entry of the second user.

20 Claims, 18 Drawing Sheets

(56) References Cited

U.S. PATENT DOCUMENTS

| | | | |
|---|---|---|---|
| 10,523,606 | B2 | 12/2019 | Kozhemiak et al. |
| 10,567,321 | B2 | 2/2020 | Kozhemiak et al. |
| 11,012,390 | B1 | 5/2021 | Husam et al. |
| 2003/0061159 | A1 | 3/2003 | Adams et al. |
| 2009/0228938 | A1 | 9/2009 | White et al. |
| 2009/0237328 | A1 | 9/2009 | Gyorfi et al. |
| 2013/0061272 | A1 | 3/2013 | Shusman |
| 2013/0339857 | A1 | 12/2013 | Garcia Bailo et al. |
| 2014/0067977 | A1 | 3/2014 | Rasmussen et al. |
| 2014/0129605 | A1 | 5/2014 | Huang |
| 2015/0312185 | A1 | 10/2015 | Langholz et al. |
| 2016/0065529 | A1 | 3/2016 | Katayama |
| 2016/0269350 | A1 | 9/2016 | Rosen et al. |
| 2016/0307351 | A1 | 10/2016 | Zhang et al. |
| 2016/0321313 | A1 | 11/2016 | Peterson |
| 2016/0359957 | A1* | 12/2016 | Laliberte ............ G06Q 30/0241 |
| 2017/0085519 | A1 | 3/2017 | Skinner et al. |
| 2017/0134456 | A1 | 5/2017 | Mcdonnell et al. |
| 2017/0220312 | A1 | 8/2017 | Lee et al. |
| 2017/0331689 | A1 | 11/2017 | Gupta |
| 2017/0339089 | A1* | 11/2017 | Longdale ................ A63F 13/63 |
| 2018/0077106 | A1 | 3/2018 | Skinner et al. |
| 2019/0207884 | A1 | 7/2019 | Kozhemiak et al. |
| 2019/0207885 | A1 | 7/2019 | Kozhemiak et al. |
| 2019/0379617 | A1 | 12/2019 | Luo et al. |
| 2020/0053034 | A1 | 2/2020 | Kozhemiak et al. |
| 2020/0106729 | A1 | 4/2020 | Kozhemiak et al. |
| 2021/0226908 | A1 | 7/2021 | Husam et al. |

FOREIGN PATENT DOCUMENTS

| | | |
|---|---|---|
| WO | 2019136089 | 7/2019 |
| WO | 2019236854 | 12/2019 |

OTHER PUBLICATIONS

"U.S. Appl. No. 16/368,037, Final Office Action dated Aug. 26, 2020", 20 pgs.

"How to take a picture using your iPhone's built-in Camera", eapl.org, [Online] Retrieved from the Internet: <URL: https://web.archive.org/web/20160405071551/https://www.eapl.org/sites/default/files/docs/The%20Native%20Camera.pdf>, (2016), 3 pgs.

"U.S. Appl. No. 16/368,037, Response filed Nov. 18, 2020 to Final Office Action dated Aug. 26, 2020", 9 pgs.

Whitwam, Ryan, "5 Super-Useful Hidden Features of the Google Pixel", Forbes.com, [Online] Retrieved from the Internet: <URL: https://www.forbes.com/sites/ryanwhitwam/2016/11/23/5-super-useful-hidden-features-of-the-google-pixel/#52c731df7911>, (Nov. 23, 2016), 6 pgs.

"International Application Serial No. PCT/US2019/012081, International Search Report dated Apr. 15, 2019", 5 pgs.

"International Application Serial No. PCT/US2019/012081, Written Opinion dated Apr. 15, 2019", 8 pgs.

"About Luxand BabyMaker—What Will Your Baby Look Like? Download Luxand BabyMaker on the AppStore! You Just Need Two Photos!", Luxand Face Recognition, [Online] Retrieved from the Internet on Apr. 4, 2019: <URL: https://web.archive.org/web/2017101705 0945/https://www.luxand.com/babymaker/> (Oct. 17, 2017), 5 pgs.

"Luxand—FaceMorpher—Create Funny Face Animations. Morph them All!", Luxand Face Recognition, [Online] Retrieved from the Internet on Apr. 4, 2019: <URL:https://web.archive.org/web/2017060807 2330/http://www.luxand.com/facemorpher/>, (Jun. 8, 2017), 3 pgs.

"FaceSwapper—Create Perfect-Looking Collages and Win Photoshopping Contests!", Luxand Face Recognition, [Online] Retrieved from the Internet on Apr. 4, 2019: <URL:https://web.archive.org/web/2017060607 2837/http://luxand.com/faceswapper/> (Jun. 6, 2017), 3 pgs.

"U.S. Appl. No. 15/860,397, Notice of Allowance dated Aug. 26, 19", 8 pgs.

"International Application Serial No. PCT/US2019/035802, International Search Report dated Sep. 26, 2019", 3 pgs.

"International Application Serial No. PCT/US2019/035802, Written Opinion dated Sep. 26, 2019", 5 pgs.

"U.S. Appl. No. 15/860,397, Notice of Allowability dated Sep. 27, 2019", 2 pgs.

"U.S. Appl. No. 16/237,296, Notice of Allowance dated Oct. 9, 2019", 8 pgs.

"U.S. Appl. No. 16/237,296, Notice of Allowability dated Dec. 20, 2019", 2 pgs.

"U.S. Appl. No. 16/654,796, Non Final Office Action dated Feb. 21, 2020", 6 pgs.

"U.S. Appl. No. 16/368,037, Non Final Office Action dated Apr. 1, 2020", 16 pgs.

"New: Reply on Instagram Direct with Photos and Videos", Instagram Blog, [Online] Retrieved from the Internet by the Examiner on Mar. 16, 2020: <URL: https://about.instagram.com/blog/announcements/new-ways-to-reply-with-photos-and-videos>, (Aug. 17, 2017), 5 pgs.

"U.S. Appl. No. 16/654,796, Response filed May 19, 2020 to Non Final Office Action dated Feb. 21, 2020", 2 pgs.

Alcantara, Anne-Marie, "10 iMessage Apps to Download and Start Using With Your Friends ASAP", Popsugar Tech, [Online] Retrieved from the Internet by the Examiner on Mar. 23, 2020: <URL: https://popsugartech.com/photo-gallery/42429484/image/42429640/Game-Pigeon>, (Feb. 21, 2017), 2 pgs.

"U.S. Appl. No. 16/368,037, Notice of Allowance dated Jan. 11, 2021", 7 pgs.

U.S. Appl. No. 17/301,535, filed Apr. 6, 2021, Media Content Response in a Messaging System.

U.S. Appl. No. 16/368,037, filed Mar. 28, 2019, Media Content Response in a Messaging System.

* cited by examiner

ACCESS AND ROUTING OF INTERACTIVE MESSAGES

BACKGROUND

A content sharing platform may receive millions of messages from users desiring to share media content such as audio, images, and video between user devices (e.g., mobile devices, personal computers, etc.). The media content of these messages may be associated with a common geolocation, a common time period, a common event, and so forth. Conventionally, a first user sends a message to a second user or to several users, and the second users or several users can view the message. The second user or several users may then create a new message and send the new message to the first user or other users.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to generating, accessing, and displaying interactive messages. As explained above, typically in a messaging system, a first user creates and sends a message to a second user. The second user receives the message from the first user and then creates and sends a new message back to the first user or to other users. Example embodiments allow for interactive messaging that allows users to interact with each other via an interactive message. For example, a first user may create a message using personal media content, such as capturing a video of himself. The first user may send the message to a second user. The second user may view the message that has the first user's personal media content and then add her own personal media content, such as a video of herself. The second user may send the message with the first user's personal media content and the second user's personal media content to a third user, back to the second user, or to several users. The third user may view the message that has the first user's personal media content and the second user's personal media content and then add her own personal media content, such as a video of herself. The third user may then send the message to one or more other users. In this way, the message is passed from one user to the next and each user is able to contribute to the message. These asynchronous experiences can be captured in an interactive message. Interactive messages are further described in U.S. Pat. No. 10,523,606, which is herein incorporated by reference in its entirety.

An interactive message may be a predefined message (e.g., videos, images, etc.) with a plurality of objects associated with different areas or characters in the interactive message for which users may add personal content (e.g., band members, game players, locations in a scene). For example, an interactive message may be a video of a band playing that has an object for each band member. Users may be able to add an image or video of their face to the face for each band member (e.g., a first user adds his face to the drummer and sends the interactive message to a second user who adds her face to the lead singer and sends the interactive message back to the first user and/or to a third user).

Figure 5:
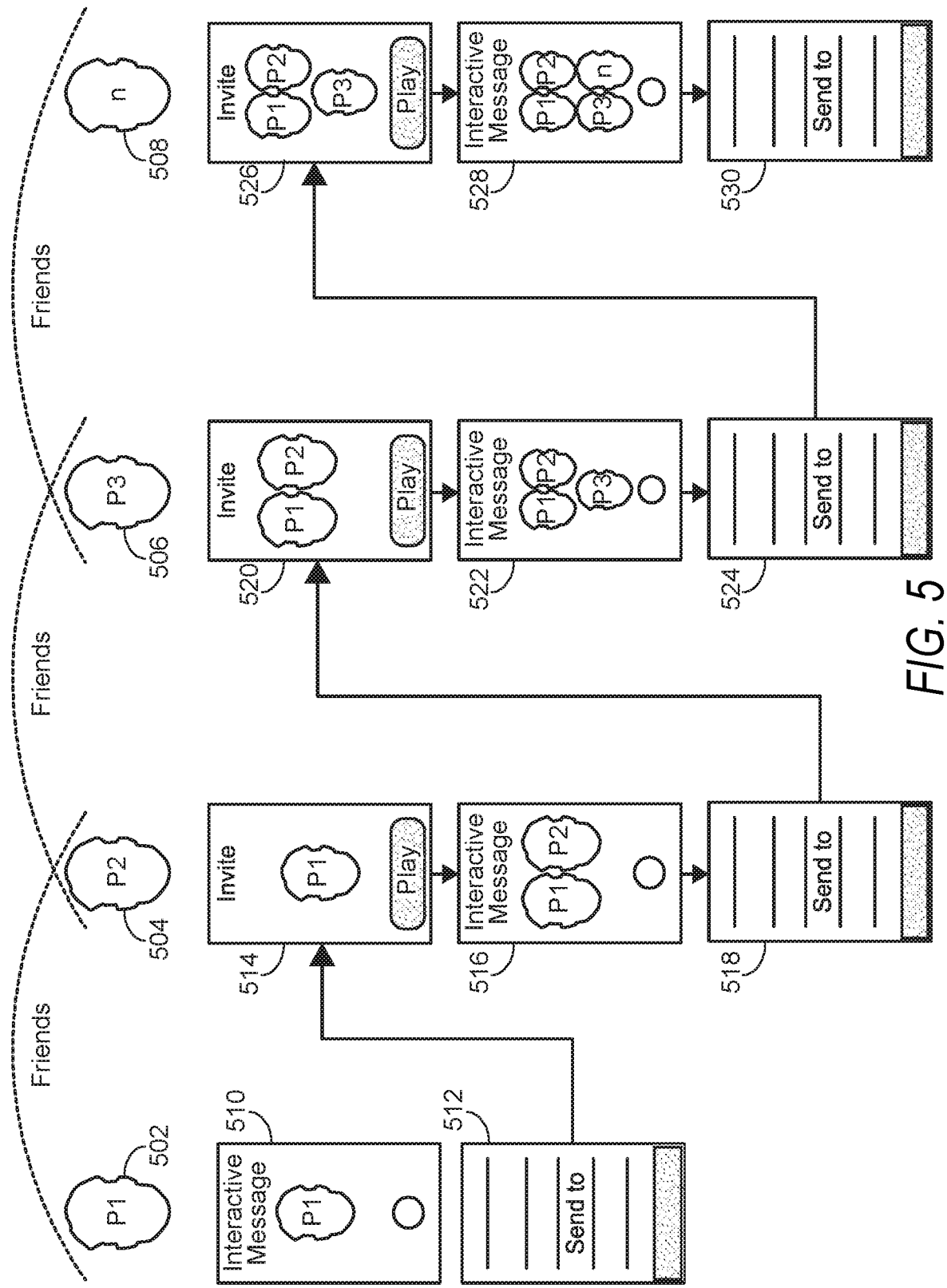
FIGS. 5-6 are diagrams illustrating examples of sharing interactive messages, according to some example embodiments.

FIG. 5 illustrates an example of sharing interactive messages, according to some example embodiments. For example, there may be a number of users, such as P1 (502), P2 (504), P3 (506), through n (508) users. A first computing device 510 for user P1 generates an interactive message using input from user P1 (e.g., text, audio, video, image). User P1 may indicate 512 that he wishes to send the interactive message to at least user P2. The first computing device 510 sends the interactive message to a second computing device 514 associated with user P2. The second computing device 514 renders and displays the interactive message. The second computing device 514 generates content, using input from user P2 (e.g., text, audio, video, image), to add to the interactive message 516. User P2 may indicate 518 that she wishes to send the interactive message 516 to a third computing device 520 associated with user P3. The third computing device 520 renders and displays the interactive message 522. The third computing device 520 generates content, using input from user P3 (e.g., text, audio, video, image), to add to the interactive message 522. User P3 may indicate 524 that she wishes to send the interactive message 522 to a fourth computing device 526 associated with user n. The fourth computing device 526 renders and displays the interactive message 528. The fourth computing device 526 generates content, using input from user n (e.g., text, audio, video, image), to add to the interactive message 528. User n may indicate 530 that she wishes to send the interactive message 528 to a fifth computing device, and so this process may continue. Note that this diagram illustrates sending interactive messages in a chain (e.g., from one user to the next user). In other example embodiments, a user may send an interactive message to more than one user and then each of those users may send the message to one or more users.

An interactive message may comprise a game that may be played and shared between users. For example, the interactive message may be a challenge experience where a first user plays a game and then challenges a second user (or more than one user) to beat their high score. This asynchronous game may be played by users by sending a user-generated interactive message back and forth to each other (or amongst multiple users). For example, a user may select a game in a messaging application running on a first computing device. The game may capture his image (e.g., a video or photograph of the user's face) and, once the game is resolved by the first user, the first computing device generates a message comprising the first user's image and the results of the game (e.g., a score or win/loss state). The first user can then customize the generated message (e.g., add text or audio, add an image or video, add a media overlay) and send it to a second user (or multiple users) as a "challenge" to beat his score. The first computing device sends the generated message to a second computing device (e.g., via a server system 108 as described above). When the second user receives the generated message, she can interact with the generated message to enter the game and try to beat the score of the first user. In some cases, the face of the original challenger is used in the new game session. These sessions then go back and forth between friends until one decides not to respond.

Figure 6:
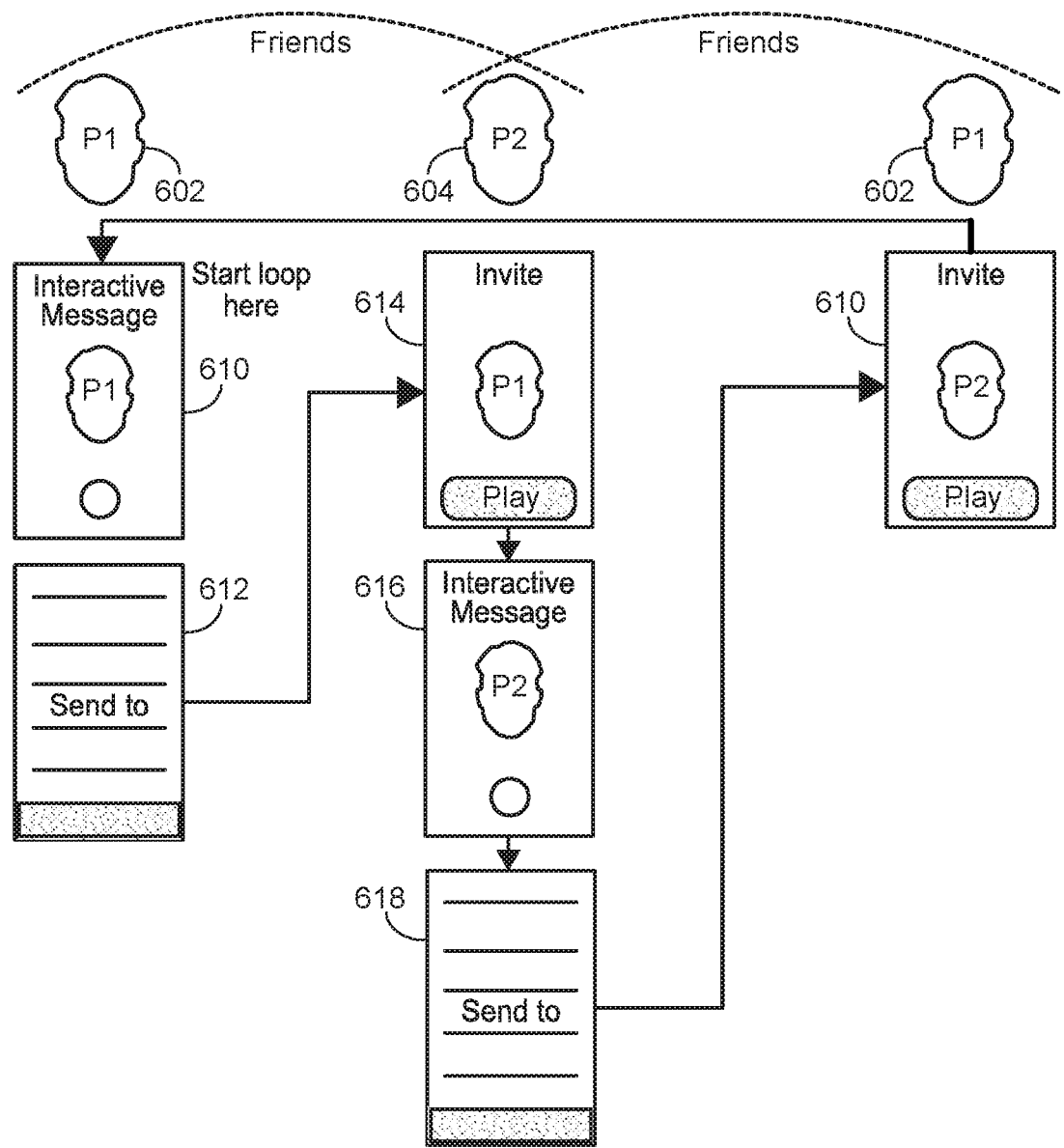

FIG. 6 illustrates an example of a game played between two users P1 (602) and P2 (604). A first user P1 602 using a computing device 610 generates an interactive message by playing a game. The first user P1 602 may then send 612 the interactive message to a second user P2 604. The second user P2 604 receives the interactive message at a second computing device 614 and generates an interactive message 616 by playing the game. The second user P2 604 may then send 618 the interactive message 616 back to the first user P1 602 via the second computing device 614.

In some example embodiments, an interactive message is an ephemeral interactive message. For example, the interactive message may be only accessible for engagement for a predetermined amount of time (e.g., 1 hour, 24 hours, 2 days), as explained in further detail below. For example, example embodiments provide for a first computing device associated with a first user determining that a message received from a second computing device associated with a second user is an interactive message and causing the interactive message to be displayed. In response to a selection to skip engagement with the interactive message, the computing device displays a message feed with a list of a plurality of users and causes a selectable engagement indicium to be displayed next to a list entry of the second user in the list. The computing device further determines that a predetermined amount of time has elapsed since the start time of the display of the interactive message without engagement with the interactive message and causes the interactive message to be deleted from the message feed and the selectable engagement indicium to be removed from next to the list entry of the second user. These and other embodiments are described in further detail below.

Figure 1:
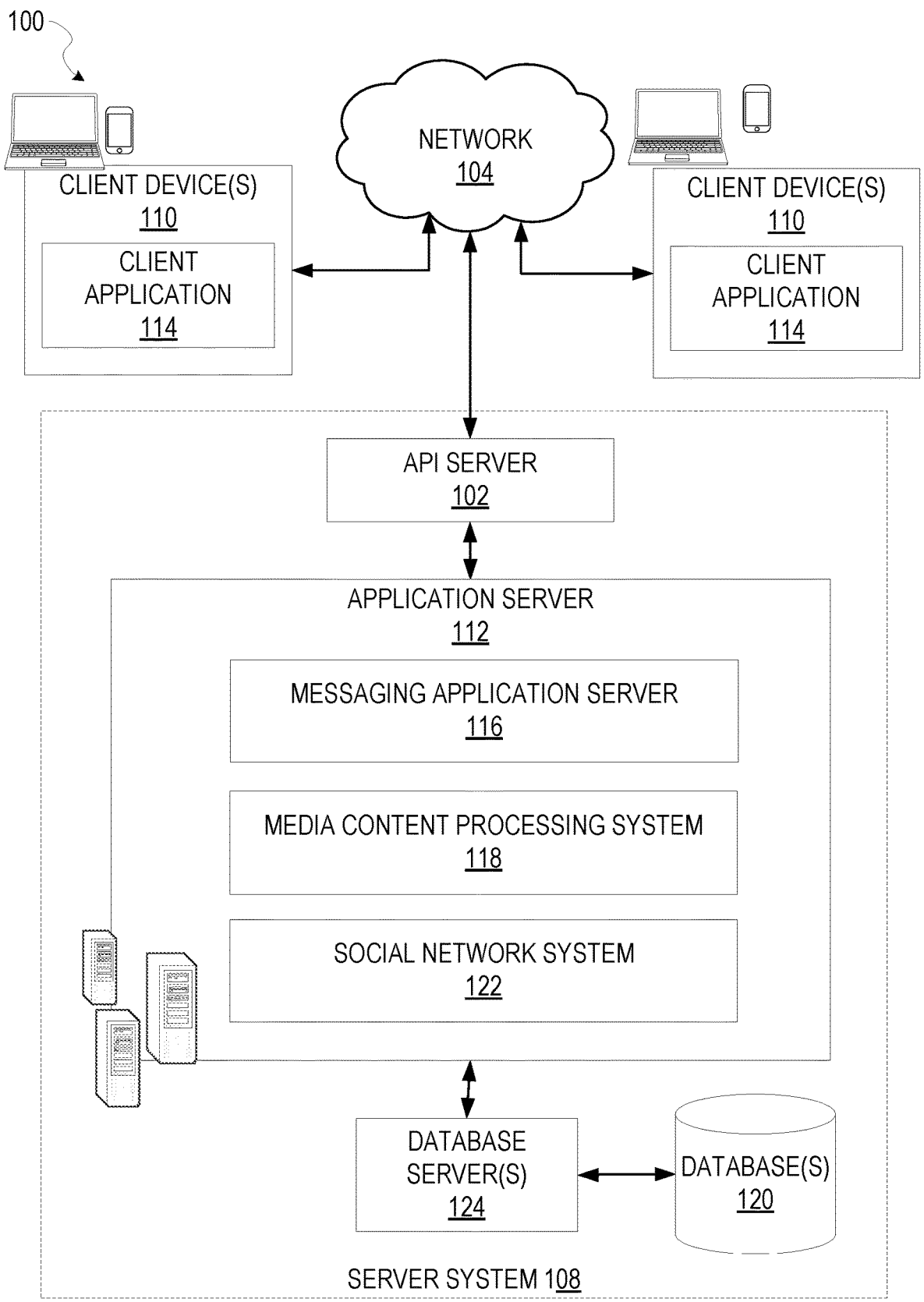
FIG. 1 is a block diagram showing an example messaging system for exchanging data (e.g., messages and associated content) over a network, according to some example embodiments.

FIG. 1 is a block diagram illustrating a networked system 100 (e.g., a messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third party servers, server system 108, etc.) via a network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft®, Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, and the like.

In some embodiments, one or more client applications 114 may be included in a given one of the client devices 110 and configured to locally provide the user interface and at least some of the functionalities, with the client application 114 configured to communicate with other entities in the system 100 (e.g., third party servers, server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third party servers, server system 108, etc.).

In one example, a client application 114 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours, 2 days). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third party servers (not shown). The server system 108 may include an application programming interface (API) server 102, an application server 112, a messaging application server 116, a media content processing system 118, and a social network system 122, which may each be communicatively coupled with each other and with one or more data storage(s), such as database(s) 120.

The server system 108 may be a cloud computing environment, according to some example embodiments. The server system 108, and any servers associated with the server system 108, may be associated with a cloud-based application, in one example embodiment.

The one or more database(s) 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user data, user device information, media content (e.g., video and images), media content data (e.g., data associated with video and images), computing device context data, serialized data, session data items, and so forth. The one or more databases 120 may further store information related to third party servers, third party applications, client devices 110, client applications 114, users, and so forth.

The one or more database(s) 120 may include cloud-based storage external to the server system 108 (e.g., hosted by one or more third-party entities external to the server system 108). While the storage devices are shown as database(s) 120, it is to be understood that the system 100 may access and store data in storage devices such as databases 120, blob storages, and other types of storage methods.

The system 100 may further include one or more third party servers (not shown). The one or more third party servers may include one or more third party application(s). The one or more third party application(s), executing on the third party server(s), may interact with the server system 108 via API server 102 via a programmatic interface provided by the API server 102. For example, one or more of the third party applications may request and utilize information from the server system 108 via the API server 102 to support one or more features or functions on a website hosted by the third party or an application hosted by the third party. The third party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed by either a client application 114 or by the server system 108, it will be appreciated that the location of certain functionality either within the client application 114 or within the server system 108 is a design choice. For example, it may be technically preferable to initially deploy certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), and media content data (e.g., data associated with video and images), as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more database(s) 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); and so forth.

The application server 112 hosts a number of applications and subsystems, including the messaging application server 116, the media content processing system 118, and the social network system 122. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
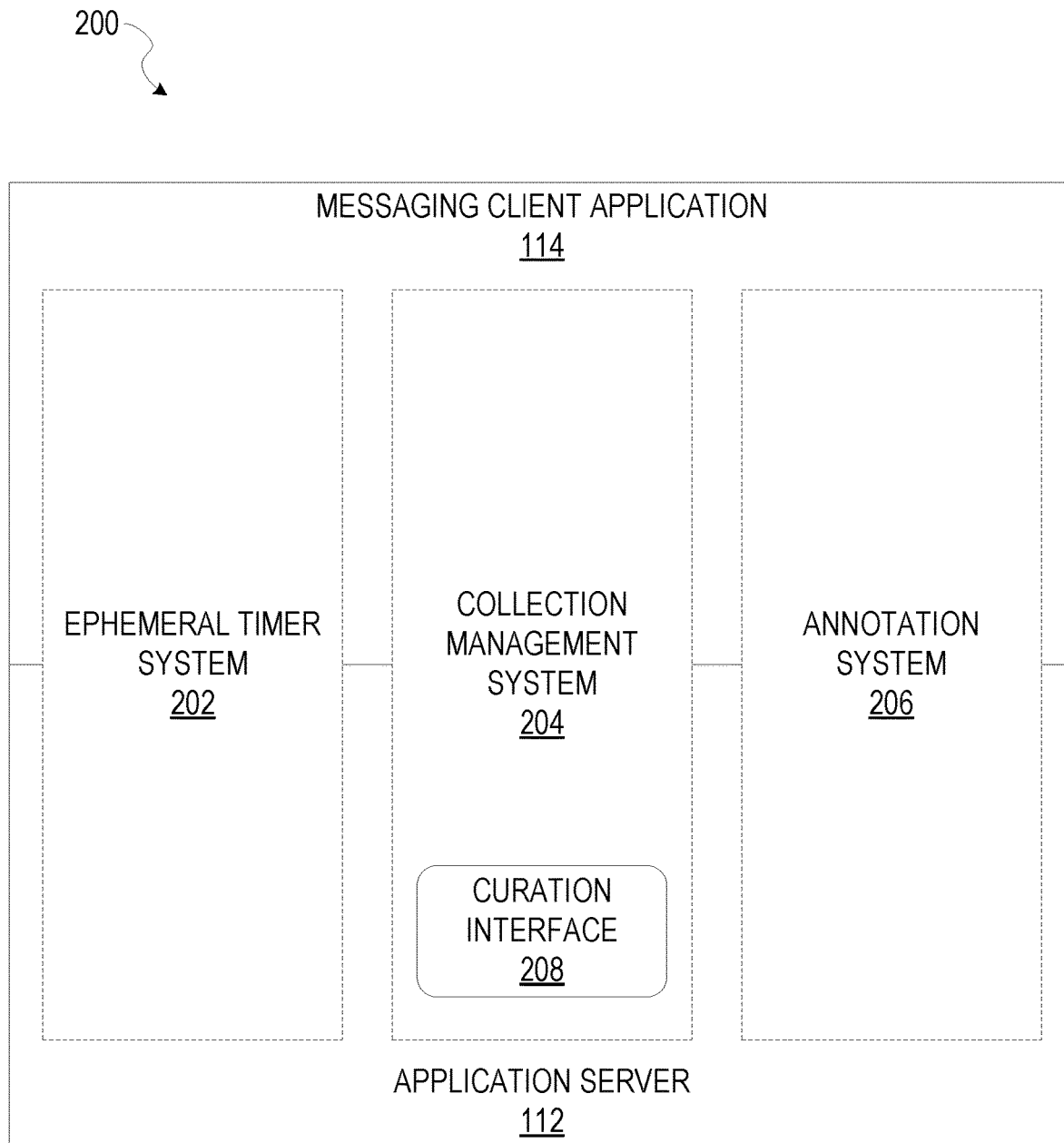
FIG. 2 is a block diagram illustrating further details regarding the messaging system, according to some example embodiments.

FIG. 2 is a block diagram 200 illustrating further details regarding the system 100, according to example embodiments. Specifically, the system 200 is shown to comprise the messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or collection of messages (e.g., otherwise referred to herein as media collections, galleries, message collections, stories, and the like), selectively display and enable access to messages and associated content via the messaging client application 114.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively supplies a media overlay (e.g., a filter or media augmentation) to the messaging client application 114 based on a geolocation of the client device 110. In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, or a name of a merchant overlay (e.g., Beach Coffee House). In another example, the annotation system 206 uses the geolocation of the client device 110 to identify a media overlay that includes the name of a merchant at the geolocation of the client device 110. The media overlay may include other indicia associated with the merchant. The media overlays may be stored in the database 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the band (a drummer, a keyboard player, a guitarist, etc.). The video of the rock band may be made available to users as an interactive message.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

Figure 3:
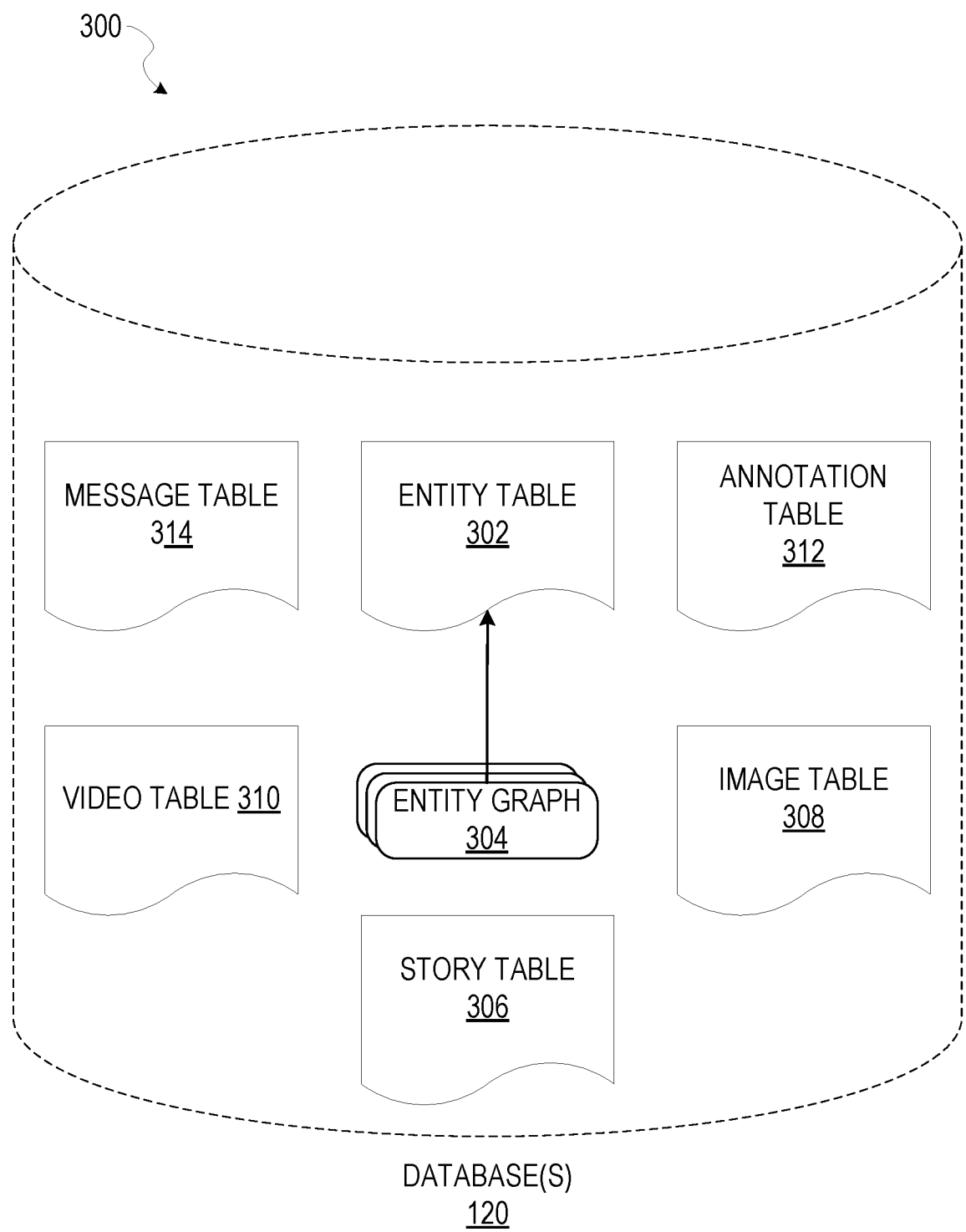
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
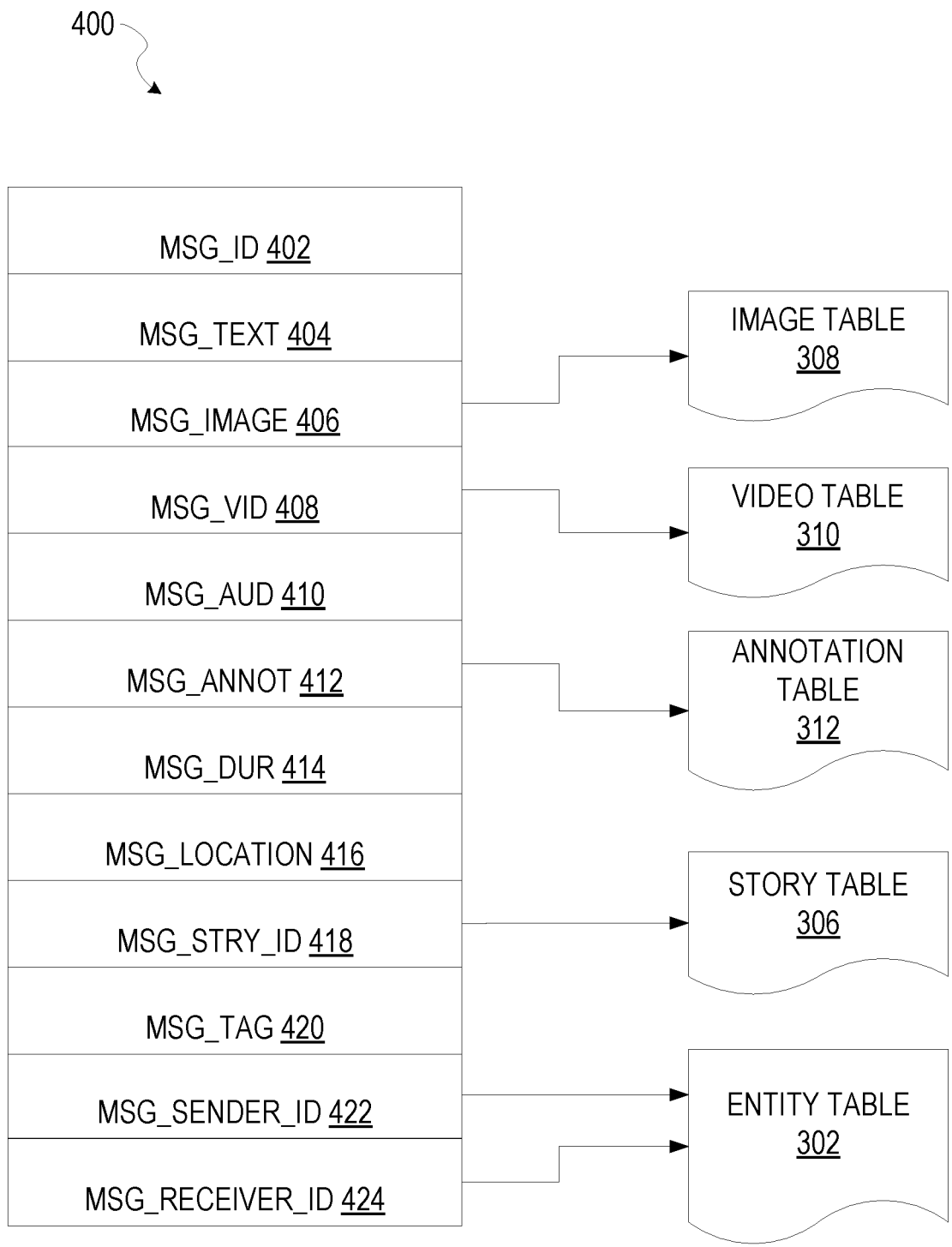
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database 120, accessible by the messaging application server 116. Similarly, the content of a message 400 is stored in memory as "in-transit" or "in-flight" data of the client device 110 or the application server 112. The message 400 is shown to include the following components:

A message identifier 402: a unique identifier that identifies the message 400.

A message text payload 404: text, to be generated by a user via a user interface of the client device 110 and that is included in the message 400.

A message image payload 406: image data, captured by a camera component of a client device 110 or retrieved from memory of a client device 110, and that is included in the message 400.

A message video payload 408: video data, captured by a camera component or retrieved from a memory component of the client device 110 and that is included in the message 400.

A message audio payload 410: audio data, captured by a microphone or retrieved from the memory component of the client device 110, and that is included in the message 400.

A message annotations 412: annotation data (e.g., media overlays such as filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, message audio payload 410) is to be presented or made accessible to a user via the messaging client application 114.

A message geolocation parameter 416: geolocation data (e.g., latitudinal and longitudinal coordinates) associated with the content payload of the message 400. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 7:
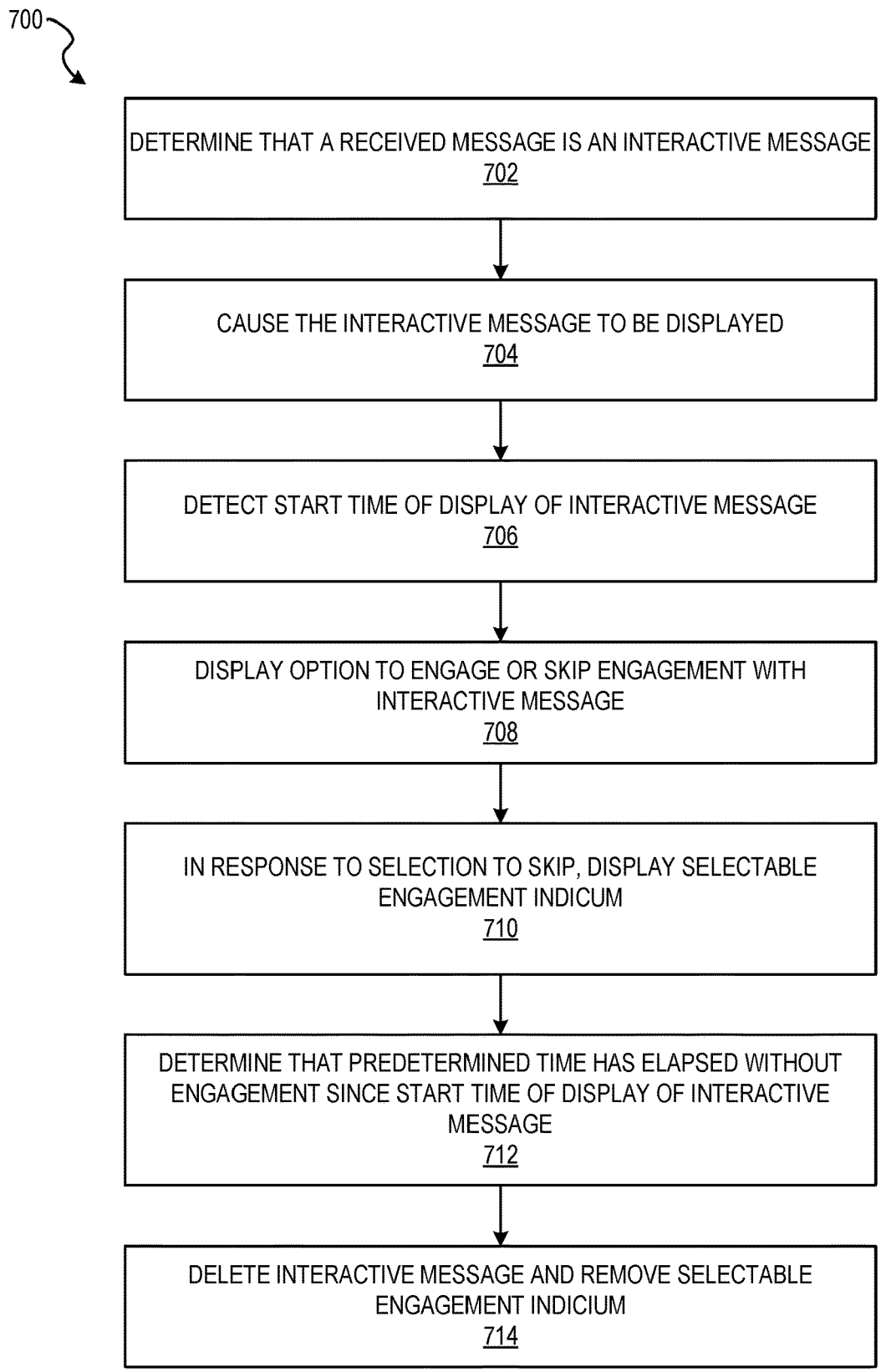
FIG. 7 is a flow chart illustrating aspects of a method, according to some example embodiments.

FIG. 7 is a flow chart illustrating aspects of a method 700, for display and access of an interactive message according to some example embodiments. For illustrative purposes, the method 700 is described with respect to the networked system 100 of FIG. 1. It is to be understood that the method 700 may be practiced with other system configurations in other embodiments.

In operation 702, a computing device (e.g., client device 110) determines that a received message is an interactive message. For example, the computing device is a first computing device associated with a first user and receives a message from a second computing device associated with a second user. The first computing device determines that the message received from the second computing device is an interactive message based on metadata associated with the message received, or other means.

Figure 8:
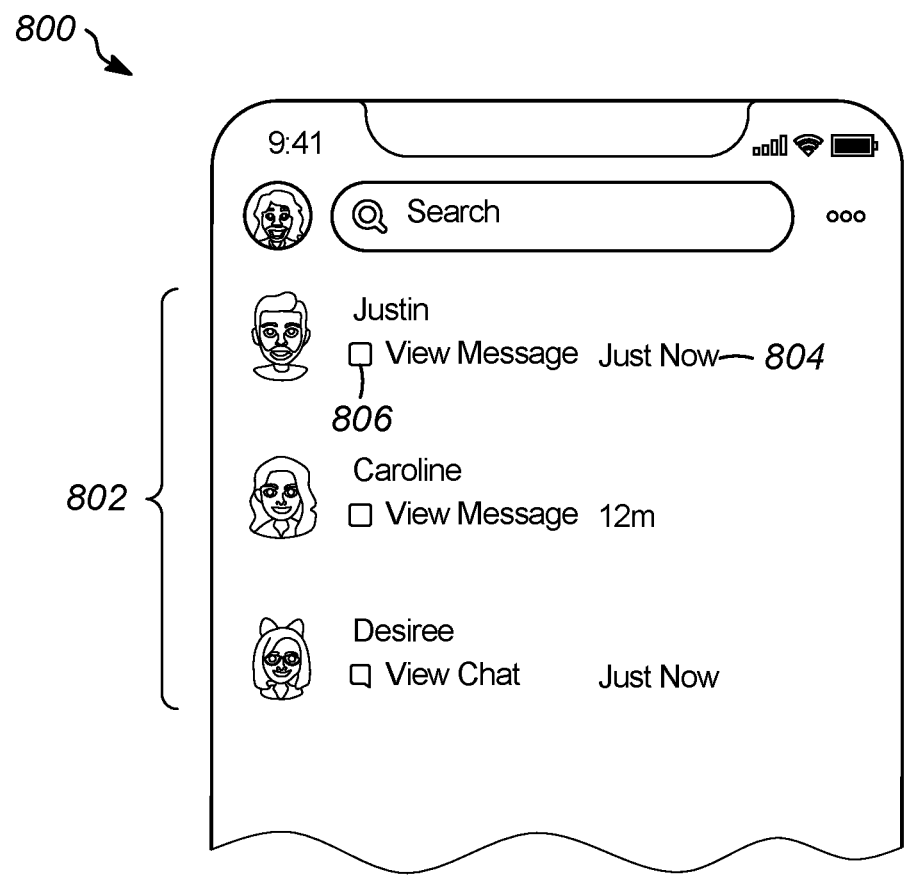
FIGS. 8-11 illustrate example graphical user interfaces, according to some example embodiments.

The computing device displays an indication that a new message has been received from the second user. For example, the computing device causes the indication to be displayed in a graphical user interface (GUI) on the computing device. In one example, the GUI comprising a messaging feed (e.g., a chat interface) with a list of a plurality of users from whom the first user has received messages or to whom the first user has sent messages. FIG. 8 illustrates an example GUI 800 comprising a message feed with a list 802 of a plurality of users from whom the first user has received messages or to whom the first user has sent messages. The message feed further comprises an indication 804 that a new message has been received from a second user (e.g., Justin).

The first user may interact with the GUI 800 by selecting an option 806 to view the new message received from the second user. For example, the first user touches or presses on the option 806 to view the message. The computing device receives the selection to view the new message received. In response to receiving the selection to view the new message and determining that the message in an interactive message, in operation 704 of FIG. 7, the computing device causes the interactive message to be displayed. In one example, the computing device causes the interactive message to be available for engagement for a predetermined amount of time (e.g., 24 hours).

Figure 9:
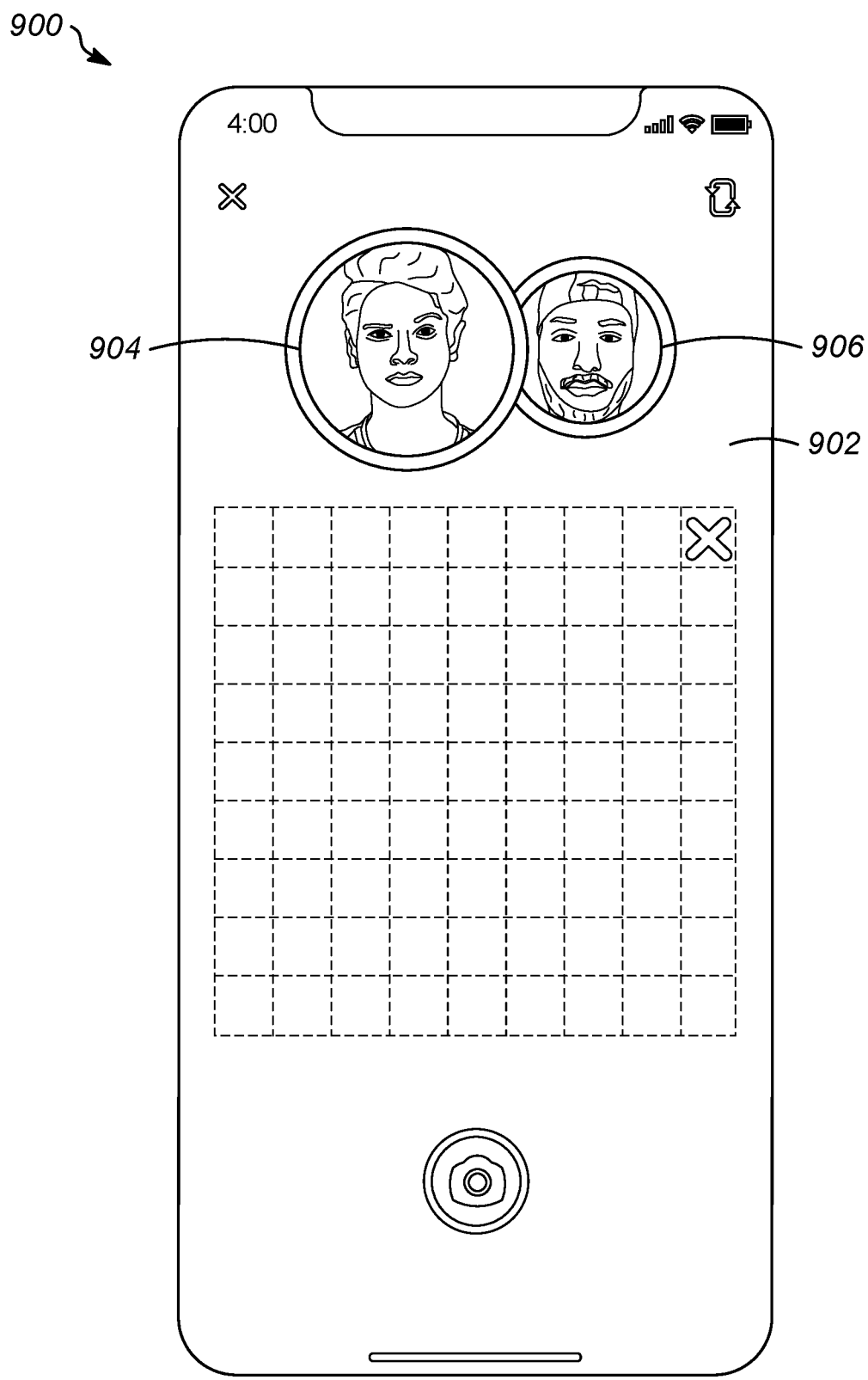

FIG. 9 illustrates an example interactive message 902 displayed on an GUI 900 of the computing device. In this example, the interactive message 902 is a tic tac toe game with two players. The example interactive message 902 further comprises two areas 904 and 906 in which each user can add a media content item, such as an image or video. It is to be understood that more or fewer areas could be included in an interactive message. The example interactive message 902 illustrates a media content item in area 906 captured by the second user (e.g., a photograph of the second user) and a media content item in area 904 captured by the first user during engagement with the interactive message 902. For example, the first user can play his or her turn at tic tac toe and capture an image of himself or herself to be included in the interactive message and sent to the second user.

Returning to FIG. 7, in operation 706, the computing device detects a start time of display of the interactive message. For example, the computing device stores a time stamp corresponding to when the interactive message was displayed and associates the time stamp with the interactive message.

Figure 10:
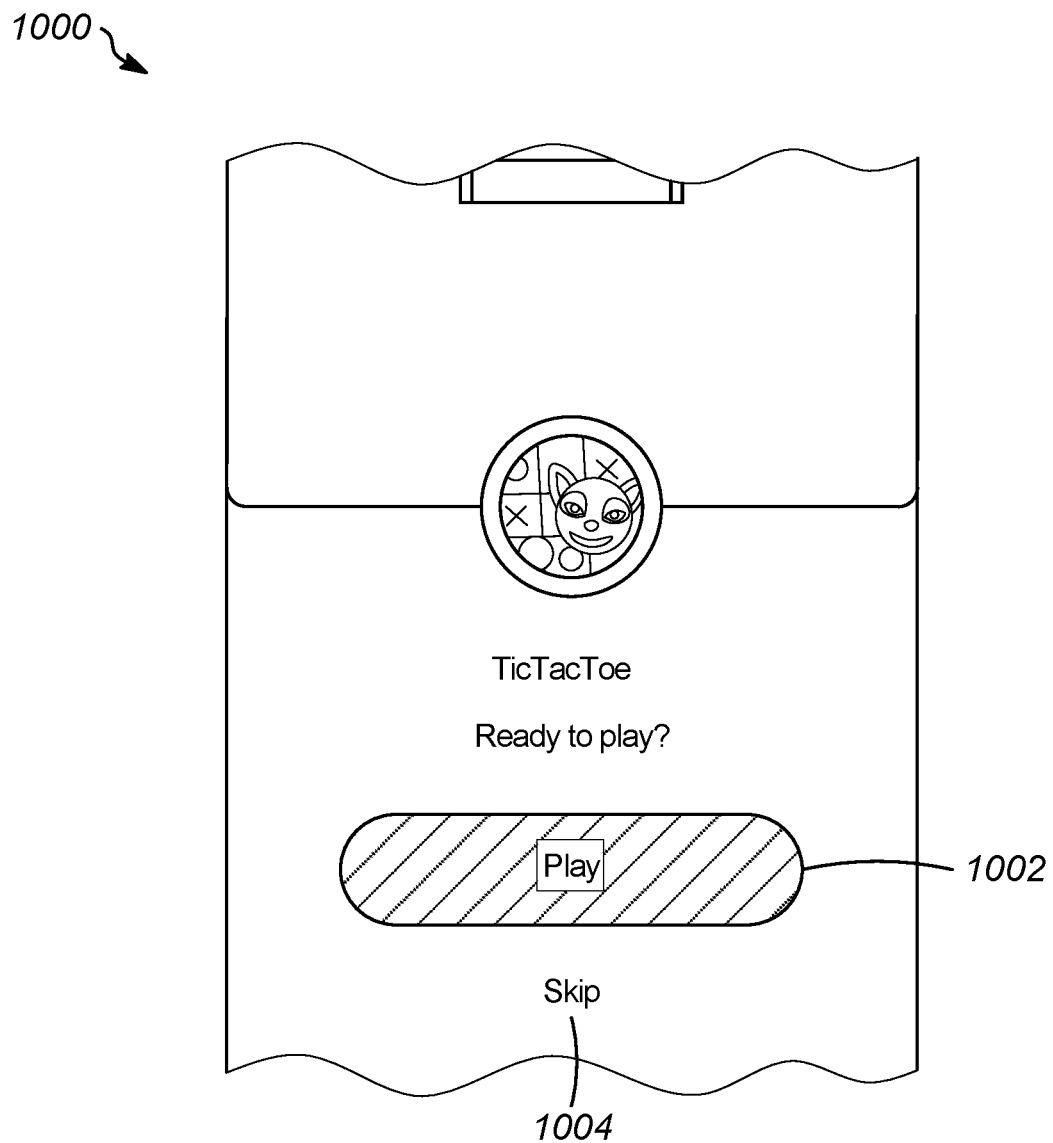

In operation 708, the computing device displays an option to engage with the interactive message or skip the interactive message. For example, after displaying the interactive message, the computing device displays a GUI 1000 with an option 1002 to play (e.g., to engage with the interactive message) or an option 1004 to skip (e.g., to skip engagement with the interactive message), as shown in the example GUI 1000 illustrated in FIG. 10. The user can select the option to engage with the interactive message (e.g., 1002) or select the option to skip engagement with the interactive message (e.g., 1004).

Figure 11:
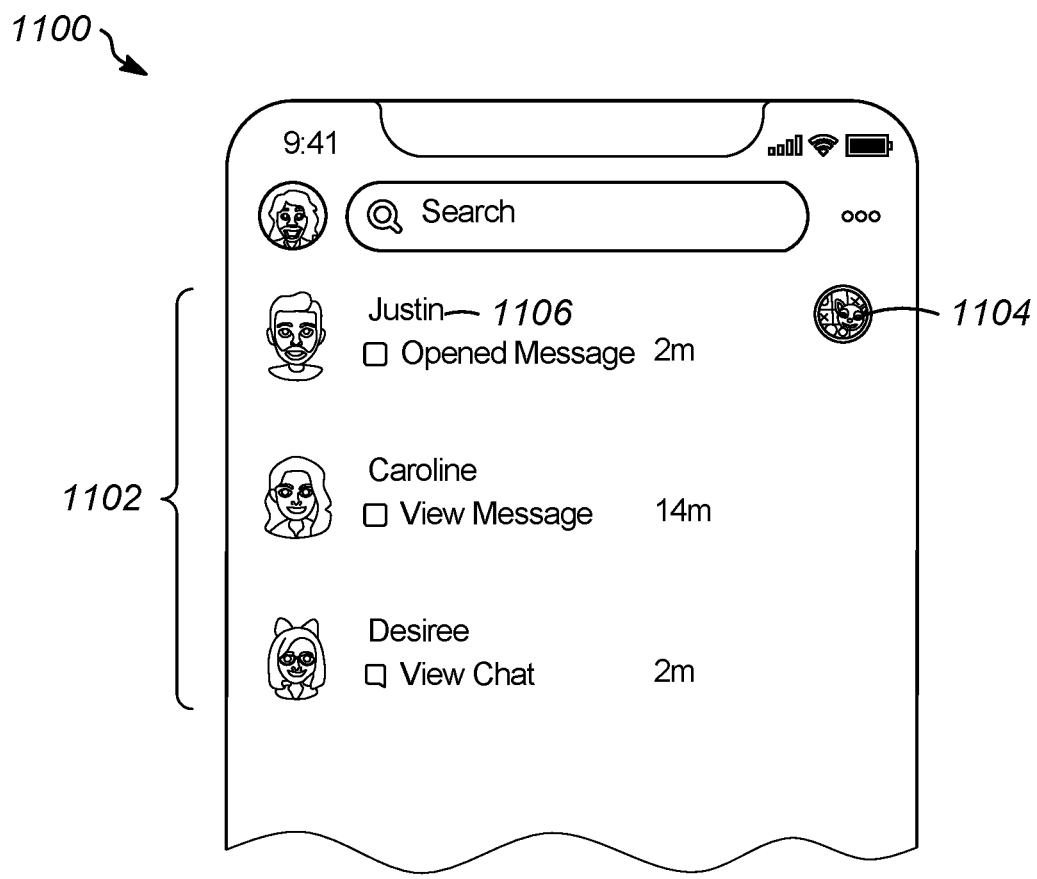

Returning to FIG. 7, in operation 710, in response to receiving a selection to skip engagement, the computing device causes a selectable engagement indicium to be displayed on a GUI of the computing device. In one example, the computing device displays the message feed with the list of the plurality of users and causes a selectable engagement indicium to be displayed next to a list entry of the second user in the list. FIG. 11 illustrates an example GUI 1100 with a message feed with a list 1102 of a plurality of users, including the second user 1106. A selectable engagement indicium 1104 is displayed next to the list entry of the second user 1106. The first user can select (e.g., press or touch) the selectable engagement indicium 1104 to engage with the interactive message (e.g., to play and generate a second interactive message). In this way, the user can easily see that an interactive message is available for engagement and easily access the interactive message.

In one example embodiment, in response to receiving the selection to skip engagement, the computing device displays a selection with the list entry of the second user to view the interactive message again.

In one embodiment, the selectable engagement indicium is removed from being displayed next to the list entry of the second user when a second message is received from the second user. For example, the computing device receives a second message from a computing device of a second user and displays an indication that a new message has been received from the second user in the GUI comprising the message feed with the list of the plurality of users from whom the first user has received messages or to whom the first user has sent messages. The computing device removes the selectable engagement indicium from being displayed next to the list entry of the second user since the interactive message (the first message received from the second user) is no longer the most current message. In one example embodiment, the interactive message can still be accessed via the list entry of the second user, for example, in a list of messages from the second user when the first user selects the entry for the second user. In one example embodiment, in the alternative or in addition, the interactive message can be accessed via a menu interface, such as a carousel, as described below.

Returning to FIG. 7, in operation 712, the computing device determines that a predetermined time (e.g., 24 hours) has elapsed without engagement since a start time of display of the interactive message. For example, the computing device determines, based on a current time, whether the predetermined time has elapsed since the time stamp associated with the start time of display of the interactive message. If the computing device determines that the predetermined time has elapsed since the start time of the interactive message without engagement with the interactive message, the computing device deletes the interactive message and removes the selectable engagement indicium, as shown in operation 714. In this way, the interactive message is no longer available to the first user for engagement.

Figure 12:
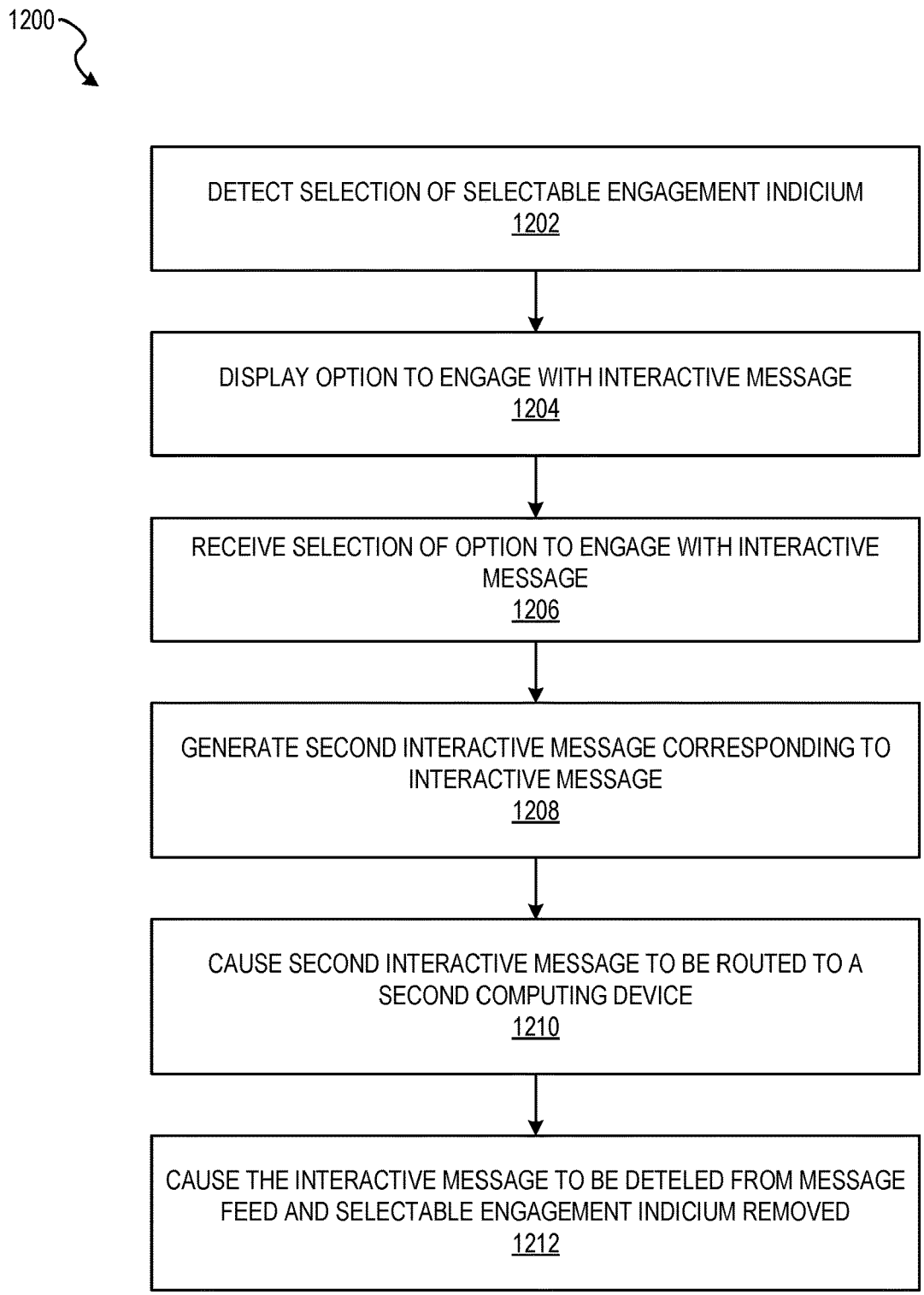
FIGS. 12-13 are flow charts illustrating aspects of a method, according to some example embodiments.

FIG. 12 is a flow chart illustrating aspects of a method 1200, for generation and routing of an interactive message according to some example embodiments. For illustrative purposes, the method 1200 is described with respect to the networked system 100 of FIG. 1. It is to be understood that the method 1200 may be practiced with other system configurations in other embodiments.

In operation 1202, the computing device (e.g., client device 110) detects a selection of a selectable engagement indicium. For example, before a predetermined amount of time has elapsed since the start time of the display of the interactive message, the computing detects a selection of selectable engagement indicium 1104 that is displayed next to the list entry of the second user 1106, as shown in FIG. 11. The computing device displays an option to engage with the interactive message, in operation 1204 (e.g., as shown as option 1002 in FIG. 10), and upon receiving a selection of the option to engage with the interact message, the computing device generates a second interactive message corresponding to the first interactive message, as shown in operation 1206.

For example, the computing device displays a GUI, such as GUI 900 of FIG. 9, that allows the user to engage with the interactive message by, for example, taking a turn at a tic tac toe game. In this example, the computing device generates the second interactive message by receiving an input for a game play and generating the second interactive message using the input from the game play. For instance, the second interactive message comprises the result from the game play by the first user and can be previewed by the user prior to sending to a second computing device (or more than one computing device).

In one example, the user can also capture an image or video to be included in the interactive message (e.g., in an area 904 of the interactive message). For example, the computing device captures an image or video via a camera of the computing device and the computing device adds the image or video to the interactive message to generate the second interactive message.

The user can then select an option to generate the second interactive message and send the second interactive message to a second user (e.g., depicted in area 906). In operation 1208, the computing device generates the second interactive message showing the user's engagement with the interactive message and, optionally, an image or video captured by the user. For example, the second interactive message can display the play of the second user and the new play of the first user along with images of both the first and second users. In one example, the interactive message is a video showing the action of play by the first user and also displaying the play already made by the second user, and optionally, the image or video of the first and second users. In another example, the interactive message is an image showing the play made by the first user and the second users and optionally, the image or video of the first and second users.

In operation 1210, the computing device causes the generated second interactive message to be routed to a second computing device associated with the second user. For example, the computing device sends the generated second interactive message to the second computing device (e.g., directly or via a server system, such as server system 108).

In operation 1212, the computing device causes the interactive message (e.g., the first interactive message received by the second user in response to which the user generated the second interactive message) to be deleted from the message feed and the selectable engagement indicium to be removed, as explained above.

Figure 13:
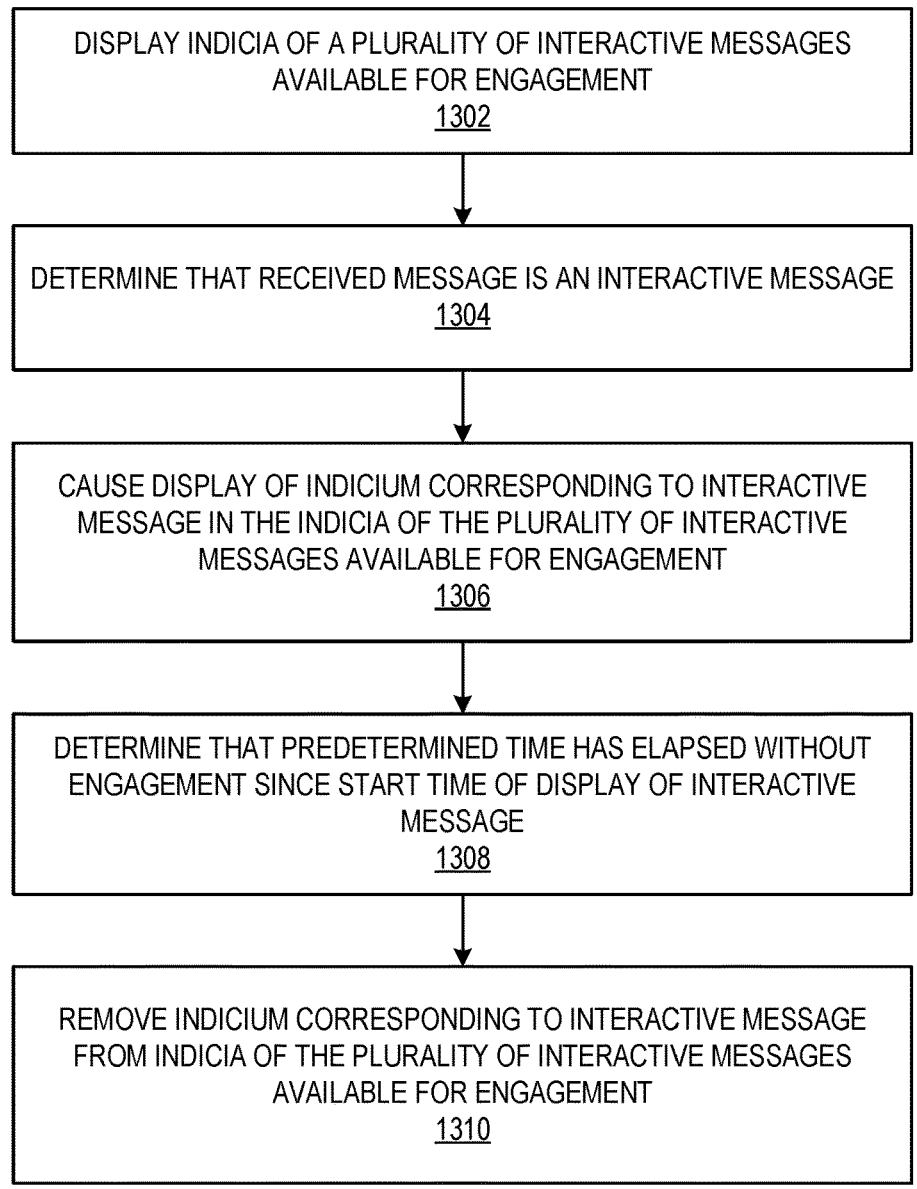

FIG. 13 is a flow chart illustrating aspects of a method 1300 for display and access of an interactive message, according to some example embodiments. For illustrative purposes, the method 1300 is described with respect to the networked system 100 of FIG. 1. It is to be understood that the method 1300 may be practiced with other system configurations in other embodiments.

In operation 1302, a computing device (e.g., client device 110) displays indicia of a plurality of interactive messages available for engagement. For example, the computing device may display in a GUI, with menu items each corresponding to an interactive message available for engagement. In one example, the interactive messages displayed are chosen based on a user interests, location, received interactive messages, and so forth. In one example, the indicia are displayed during display of a camera view on the computing device.

Figure 14:
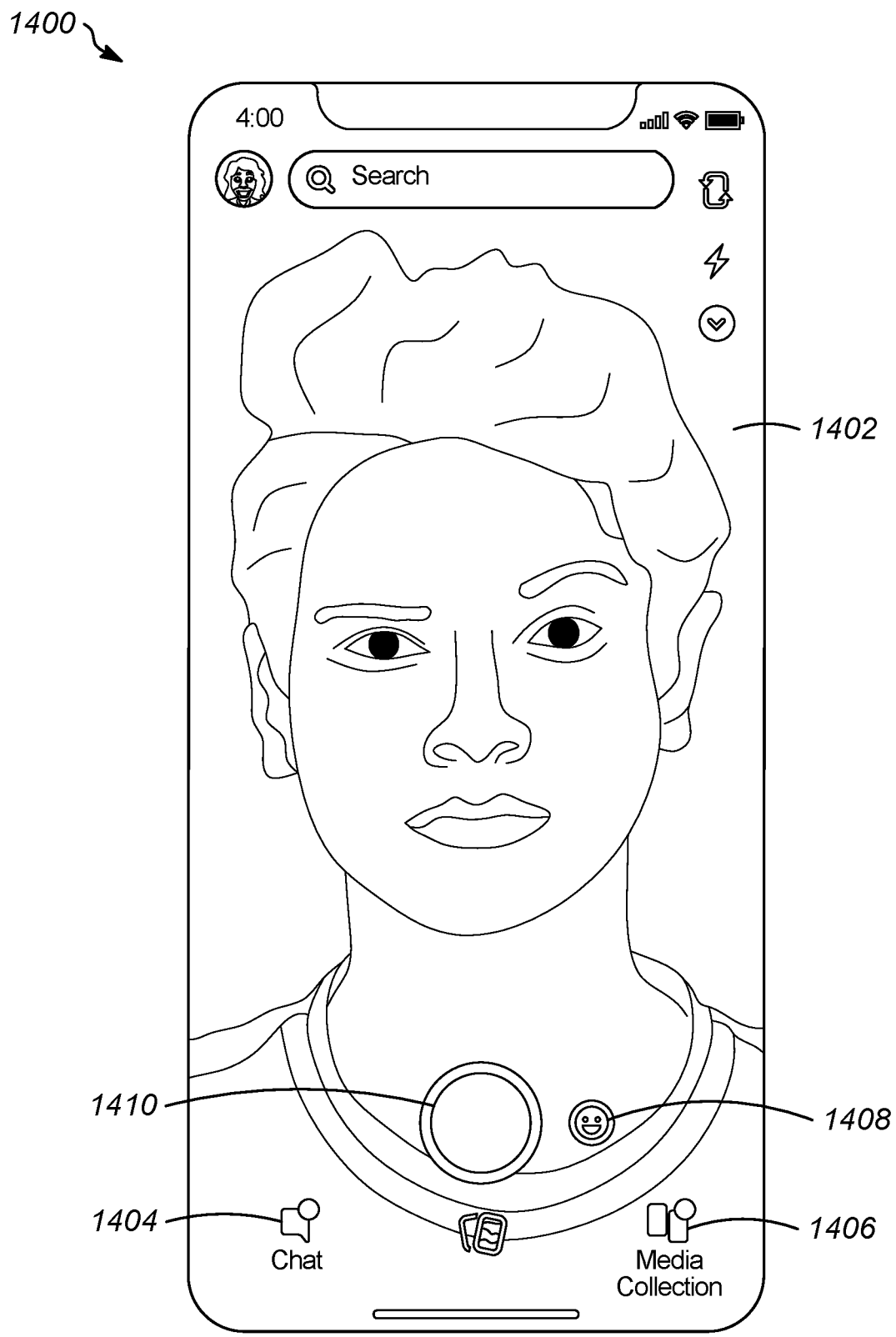
FIGS. 14-16 illustrate example graphical user interfaces, according to some example embodiments.

FIG. 14 illustrates an example GUI 1400 showing a camera view 1402. In the example camera view 1402, the user is viewing himself through the camera. The GUI 1400 further comprises an option 1404 to select for chat, an option 1406 to select to view media collections, an option 1408 to view media overlays and/or interactive messages, and an option 1410 to capture an image or video (e.g., to capture the image of the user viewed in the camera view 1402).

Figure 15:
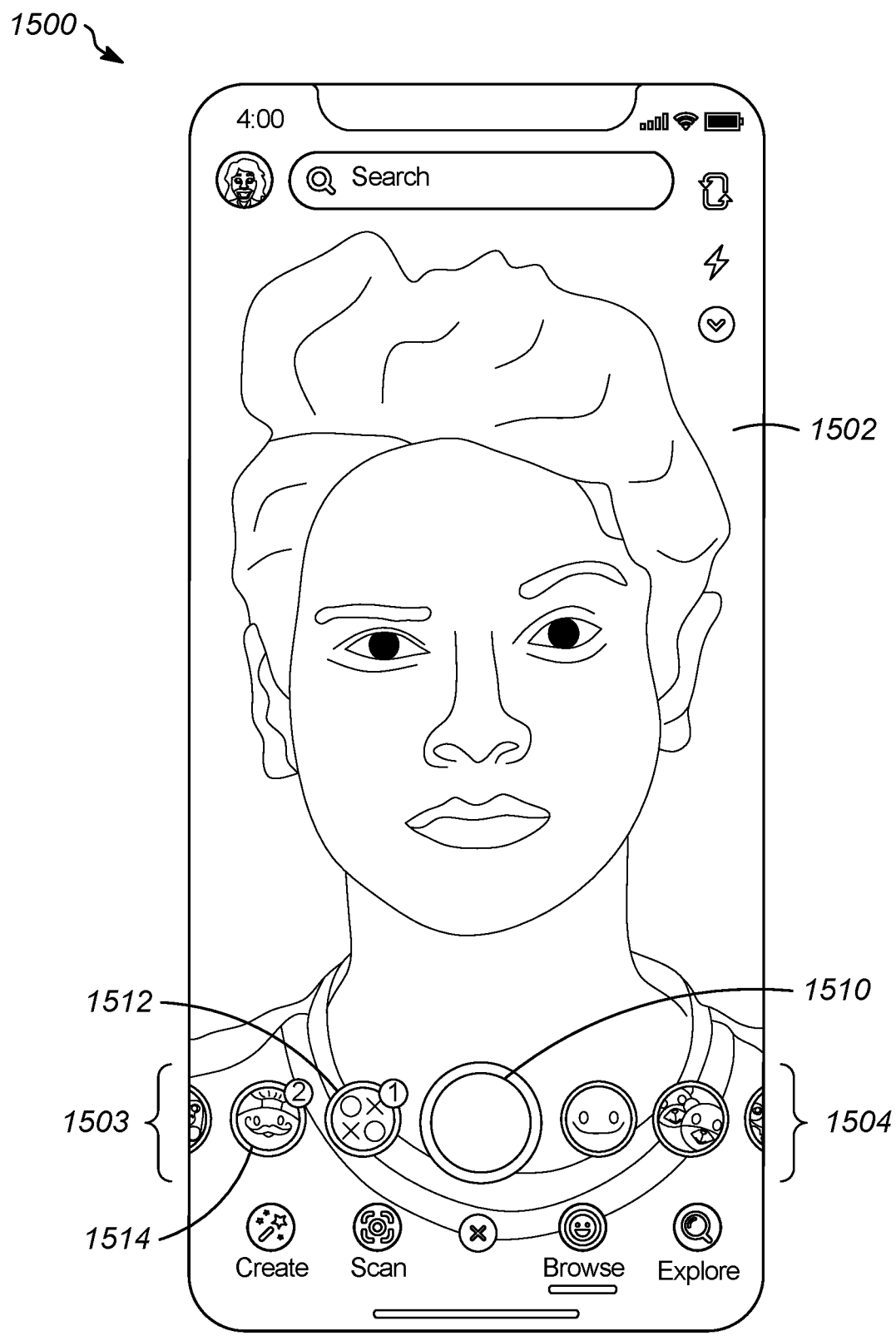

FIG. 15 illustrates an example GUI 1500 showing a camera view 1502. In the example camera view 1502, the user is viewing himself through the camera. The GUI 1500 further comprises a plurality of menu items 1503 and 1504. In this example, the plurality of menu items 1503 comprise indicia of a plurality of interactive messages available for engagement, and the plurality of menu items 1504 comprise indicia for a plurality of media overlays. In this example, the plurality of menu items 1503 and 1504 are in a carousel format that allows a user to scroll through the menu items 1503 and 1504 to select an interactive message (or media overlay). The GUI 1500 further comprises an option 1510 to capture an image or video. In the example GUI 1500, during the display in a camera view on the first computing device, the computing device causes display of indicia (e.g., 1503) of a plurality of interactive messages available for engagement.

Returning to FIG. 3, in operation 1304, the computing device determines that a received message is an interactive message, as described above. After receiving the interactive message from the second computing device, the computing device causes display of an indicium corresponding to the interactive message received from the second computing device, in the display of indicia of interactive message available for engagement, in operation 1306.

For example, the computing device determines whether an indicium for the interactive message is already displayed in the indicia of the plurality of interactive messages for engagement. If an indicium for the interactive message is not already displayed in the indicia of the plurality of interactive messages for engagement, the computing device adds a new indicium to the indicia of the plurality of interactive messages for engagement. For example, the computing device adds an indicium 1512 for the tic tac toe game of the example described above, to the indicia or menu items 1503 shown in FIG. 15.

In one example embodiment, the indicium corresponding to the interactive message received from the second computing device comprises an indicator corresponding to a number of active sessions for the interactive message. For example, the indicium 1512 for the tic tac toe game shown in FIG. 15 has a number 1 on it indicating that the user has one active session (e.g., with the second user) for the tic tac toe game. As another example, the indicium 1514 for another interactive message has a number 2 on it indicating that the user has two active sessions (e.g., a session with two different users to two different groups of users) for the interactive message corresponding to the indicium 1514.

If after receiving the interactive message from the second user the computing device determines that an indicium for the interactive message is already displayed in the indicia of the plurality of interactive messages for engagement, the computing device causes display of an indicator on the indicium corresponding to the interactive message received from the second computing device. As described above, the indicator corresponds to a number of active sessions for the interactive message. Accordingly, the computing device can add an indicator (e.g., if no active sessions yet) or increase the number of active sessions for the interactive messages and update the indicator based on receiving the interactive message from the second computing device or based on detecting engagement with the interactive message received from the second computing device.

As described above, the computing device can determine whether a predetermined amount of time has elapsed since the start time of a display of the interactive message without engagement of the interactive message. In operation 1308, the computing device determines that a predetermined time has elapsed since the start time of the display of the interactive message without engagement with the interactive messages, and in operation 1310, the computing device removes the indicium corresponding to the interactive message received from the second computing device to be removed from the display of indicia of interactive messages available for engagement.

Figure 16:
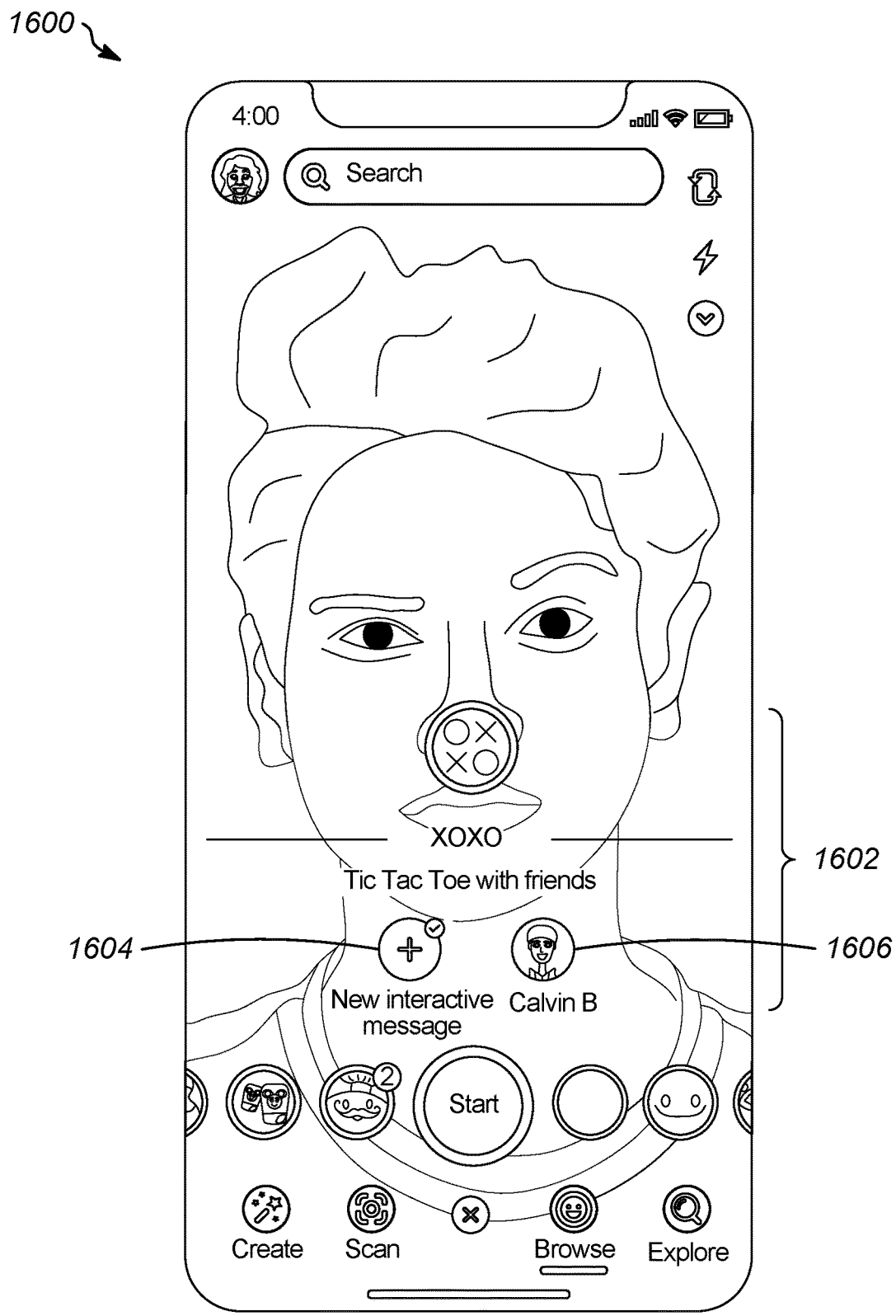

FIG. 16 illustrates an example GUI 1600 showing what is displayed when a user selects an interactive message for viewing and/or engagement. As described above, the computing device captures the start time stamp of the start time of a display of the interactive message (e.g., when the user views the interactive message). In one example embodiment, after the user views the interactive message via selecting the indicium in the GUI, a selectable engagement indicium is displayed next to a list entry of the second user in the list of a message feed, as described above.

In the example illustrated in FIG. 16, the user has selected option 1512 (shown in FIG. 15) for the interactive message received from the second computing device of the second user. The GUI 1600 displays content 1602 related to the interactive message (e.g., the name and description of the interactive message) and an option 1604 to generate a new interactive message and an option 1606 to view and engage with the interactive message received from the second user (e.g., Calvin B in this example). The user can then generate a new or second interactive message, as described above.

The following examples describe various embodiments of methods, machine-readable media, and systems (e.g., machines, devices, or other apparatus) discussed herein.

Example 1. A method comprising:
  receiving, by a first computing device associated with a first user, a message from a second computing device associated with a second user;
  determining, by the first computing device, that the message is an interactive message;
  displaying an indication that a new message has been received from the second user, in a graphical user interface comprising a message feed with a list of a plurality of users from which the first user has received messages or to which the first user has sent messages;
  receiving a selection to view the new message received from the second user;
  in response to receiving a selection to view the new message and determining that the message is an interactive message:
    causing the interactive message to be displayed;
    detecting a start time of the display of the interactive message; and
    after display of the interactive message, displaying an option to engage with the interactive message or to skip engagement;
  in response to receiving a selection to skip engagement, displaying the message feed with the list of the plurality of users and causing a selectable engagement indicium to be displayed next to a list entry of the second user in the list;
    determining that a predetermined amount of time has elapsed since the start time of the display of the interactive message without engagement with the interactive message; and
    causing the interactive message to be deleted from the message feed and the selectable engagement indicium removed from next to the list entry of the second User.

Example 2. A method according to any of the previous examples, wherein the interactive message is a first interactive message and further comprising:
  before determining that the predetermined amount of time has elapsed since the start time of the display of the interactive message, detecting a selection of the selectable engagement indicium next to the list entry of the second user in the list;
  displaying an option to engage with the interactive message;
  receiving a selection of the option to engage with the interactive message;
  generating a second interactive message corresponding to the first interactive message;
  causing the second interactive message to be sent to the second computing device associated with the second user; and
  causing the first interactive message to be deleted from the message feed and the selectable engagement indicium removed from next to the list entry of the second user.

Example 3. A method according to any of the previous examples, wherein generating the second interactive message comprises:
  capturing an image or video via a camera of the first computing device; and
  adding the image or video to the first interactive message to generate the second interactive message.

Example 4. A method according to any of the previous examples, wherein generating the second interactive message comprises receiving an input for a game play and generating the second interactive message using the input for the game play.

Example 5. A method according to any of the previous examples, wherein the message is a first message and further comprising:
  receiving a second message from the second user;
  displaying an indication that a new message has been received from the second user in the graphical user interface comprising the message feed with the list of the plurality of users from whom the first user has received messages or to whom the first user has sent messages; and
  removing the removing the selectable engagement indicium from being displayed next to the list entry of the second user.

Example 6. A method according to any of the previous examples, wherein in response to receiving the selection to skip engagement, further displaying a selection with the list entry of the second user to view the interactive message again.

Example 7. A method according to any of the previous examples, further comprising:
  during a display in a camera view on the first computing device, causing display of indicia of a plurality of interactive messages available for engagement;
  after receiving the interactive message from the second computing device, causing display of an indicium corresponding to the interactive message received from the second computing device in the display of indicia of interactive messages available for engagement; and
  causing the indicium corresponding to the interactive message received from the second computing device to be removed from the display of indicia of interactive messages available for engagement upon determination that a predetermined amount of time has elapsed since the start time of the display of the interactive message without engagement with the interactive message.

Example 8. A method according to any of the previous examples, wherein the indicium corresponding to the interactive message received from the second computing device comprises an indicator corresponding to a number of active sessions for the interactive message.

Example 9. A method according to any of the previous examples, further comprising:
  during a display in a camera view on the first computing device, causing display of indicia of a plurality of interactive messages available for engagement, the plurality of interactive messages including an indicium corresponding to the interactive message received from the second computing device; and after receiving the interactive message from the second computing device, causing display of an indicator on the indicium corresponding to the interactive message received from the second computing device, the indicator corresponding to a number of active sessions for the interactive message.

Example 10. A method according to any of the previous examples, further comprising:

increasing the number of active sessions for the interactive message and updating the indicator based on detecting engagement with the interactive message received from the second computing device.

Example 11. A computing device comprising:

one or more hardware processors; and a computer-readable medium coupled with the one or more hardware processors, the computer-readable medium comprising instructions stored thereon that are executable by the one or more hardware processors to cause the computing device to perform operations comprising:

receiving a message from a second computing device associated with a second user, wherein the computing device is a first computing device associated with a first user;

determining that the message is an interactive message;

displaying an indication that a new message has been received from the second user, in a graphical user interface comprising a message feed with a list of a plurality of users from which the first user has received messages or to which the first user has sent messages;

receiving a selection to view the new message received from the second user;

in response to receiving a selection to view the new message and determining that the message is an interactive message:

causing the interactive message to be displayed;

detecting a start time of the display of the interactive message; and after display of the interactive message, displaying an option to engage with the interactive message or to skip engagement;

in response to receiving a selection to skip engagement, displaying the message feed with the list of the plurality of users and causing a selectable engagement indicium to be displayed next to a list entry of the second user in the list;

determining that a predetermined amount of time has elapsed since the start time of the display of the interactive message without engagement with the interactive message; and causing the interactive message to be deleted from the message feed and the selectable engagement indicium removed from next to the list entry of the second user.

Example 12. A computing device according to any of the previous examples, wherein the interactive message is a first interactive message and the operations further comprise:

before determining that the predetermined amount of time has elapsed since the start time of the display of the interactive message, detecting a selection of the selectable engagement indicium next to the list entry of the second user in the list;

displaying an option to engage with the interactive message;

receiving a selection of the option to engage with the interactive message;

generating a second interactive message corresponding to the first interactive message;

causing the second interactive message to be sent to the second computing device associated with the second user; and causing the first interactive message to be deleted from the message feed and the selectable engagement indicium removed from next to the list entry of the second user.

Example 13. A computing device according to any of the previous examples, wherein generating the second interactive message comprises:

capturing an image or video via a camera of the first computing device; and adding the image or video to the first interactive message to generate the second interactive message.

Example 14. A computing device according to any of the previous examples, wherein generating the second interactive message comprises receiving an input for a game play and generating the second interactive message using the input for the game play.

Example 15. A computing device according to any of the previous examples, wherein the message is a first message and the operations further comprise:

receiving a second message from the second user;

displaying an indication that a new message has been received from the second user in the graphical user interface comprising the message feed with the list of the plurality of users from whom the first user has received messages or to whom the first user has sent messages; and removing the removing the selectable engagement indicium from being displayed next to the list entry of the second user.

Example 16. A computing device according to any of the previous examples, the operations further comprising:

during a display in a camera view on the first computing device, causing display of indicia of a plurality of interactive messages available for engagement;

after receiving the interactive message from the second computing device, causing display of an indicium corresponding to the interactive message received from the second computing device in the display of indicia of interactive messages available for engagement; and causing the indicium corresponding to the interactive message received from the second computing device to be removed from the display of indicia of interactive messages available for engagement upon determination that a predetermined amount of time has elapsed since the start time of the display of the interactive message without engagement with the interactive message.

Example 17. A computing device according to any of the previous examples, wherein the indicium corresponding to the interactive message received from the second computing device comprises an indicator corresponding to a number of active sessions for the interactive message.

Example 18. A computing device according to any of the previous examples, the operations further comprising:

during a display in a camera view on the first computing device, causing display of indicia of a plurality of interactive messages available for engagement, the plurality of interactive messages including an indicium corresponding to the interactive message received from the second computing device; and after receiving the interactive message from the second computing device, causing display of an indicator on the indicium corresponding to the interactive message received from the second computing device, the indicator corresponding to a number of active sessions for the interactive message.

Example 19. A computing device according to any of the previous examples, the operations further comprising:

increasing the number of active sessions for the interactive message and updating the indicator based on detecting engagement with the interactive message received from the second computing device.

Example 20. A non-transitory computer-readable medium comprising instructions stored thereon that are executable by at least one processor to cause a computing device to perform operations comprising:

receiving a message from a second computing device associated with a second user, wherein the computing device is a first computing device associated with a first user:

determining that the message is an interactive message;

displaying an indication that a new message has been received from the second user, in a graphical user interface comprising a message feed with a list of a plurality of users from which the first user has received messages or to which the first user has sent messages;

receiving a selection to view the new message received from the second user;

in response to receiving a selection to view the new message and determining that the message is an interactive message:

causing the interactive message to be displayed;

detecting a start time of the display of the interactive message; and after display of the interactive message, displaying an option to engage with the interactive message or to skip engagement;

in response to receiving a selection to skip engagement, displaying the message feed with the list of the plurality of users and causing a selectable engagement indicium to be displayed next to a list entry of the second user in the list;

determining that a predetermined amount of time has elapsed since the start time of the display of the interactive message without engagement with the interactive message; and causing the interactive message to be deleted from the message feed and the selectable engagement indicium removed from next to the list entry of the second user.

Figure 17:
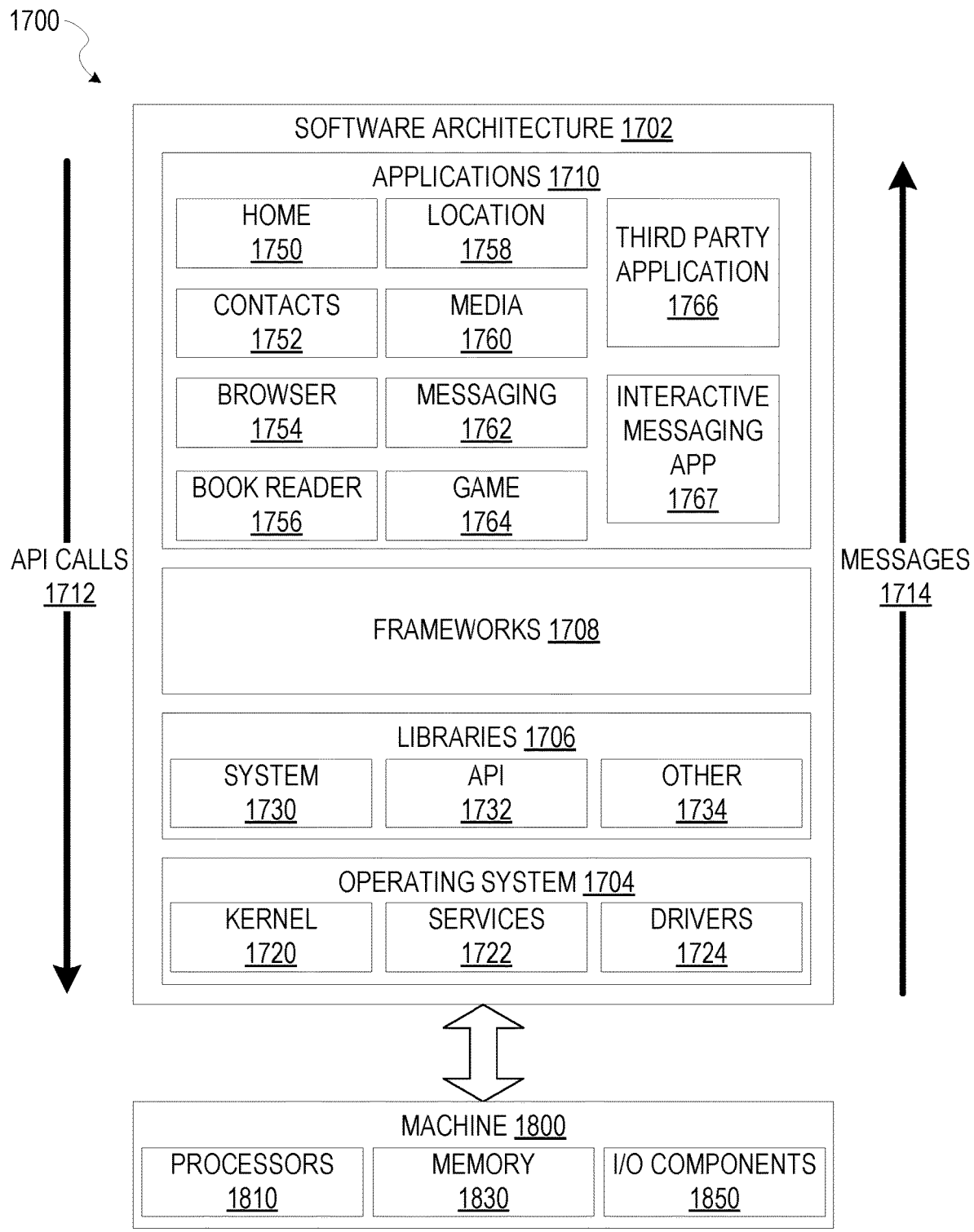
FIG. 17 is a block diagram illustrating an example of a software architecture that may be installed on a machine, according to some example embodiments.

FIG. 17 is a block diagram 1700 illustrating a software architecture 1702, which can be installed on any one or more of the devices described above. For example, in various embodiments, client devices 110, server systems 102, 112, 116, 118, 122, and 124 may be implemented using some or all of the elements of the software architecture 1702. FIG. 17 is merely a non-limiting example of a software architecture, and it will be appreciated that many other architectures can be implemented to facilitate the functionality described herein. In various embodiments, the software architecture 1702 is implemented by hardware such as machine 1800 of FIG. 18 that includes processors 1810, memory 1830, and input/output (I/O) components 1850. In this example, the software architecture 1702 can be conceptualized as a stack of layers where each layer may provide a particular functionality. For example, the software architecture 1702 includes layers such as an operating system 1704, libraries 1706, frameworks 1708, and applications 1710. Operationally, the applications 1710 invoke API calls 1712 through the software stack and receive messages 1714 in response to the API calls 1712, consistent with some embodiments.

In various implementations, the operating system 1704 manages hardware resources and provides common services. The operating system 1704 includes, for example, a kernel 1720, services 1722, and drivers 1724. The kernel 1720 acts as an abstraction layer between the hardware and the other software layers, consistent with some embodiments. For example, the kernel 1720 provides memory management, processor management (e.g., scheduling), component management, networking, and security settings, among other functionality. The services 1722 can provide other common services for the other software layers. The drivers 1724 are responsible for controlling or interfacing with the underlying hardware, according to some embodiments. For instance, the drivers 1724 can include display drivers, camera drivers, B LUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1706 provide a low-level common infrastructure utilized by the applications 1710. The libraries 1706 can include system libraries 1730 (e.g., C standard library) that can provide functions such as memory allocation functions, string manipulation functions, mathematic functions, and the like. In addition, the libraries 1706 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1706 can also include a wide variety of other libraries 1734 to provide many other APIs to the applications 1710.

The frameworks 1708 provide a high-level common infrastructure that can be utilized by the applications 1710, according to some embodiments. For example, the frameworks 1708 provide various GUI functions, high-level resource management, high-level location services, and so forth. The frameworks 1708 can provide a broad spectrum of other APIs that can be utilized by the applications 1710, some of which may be specific to a particular operating system 1704 or platform.

In an example embodiment, the applications 1710 include a home application 1750, a contacts application 1752, a browser application 1754, a book reader application 1756, a location application 1758, a media application 1760, a messaging application 1762, a game application 1764, and a broad assortment of other applications such as a third party application 1766. According to some embodiments, the applications 1710 are programs that execute functions defined in the programs. Various programming languages can be employed to create one or more of the applications 1710, structured in a variety of manners, such as object-oriented programming languages (e.g., Objective-C, Java, or C++) or procedural programming languages (e.g., C or assembly language). In a specific example, the third party application 1766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1766 can invoke the API calls 1712 provided by the operating system 1704 to facilitate functionality described herein.

Some embodiments may particularly include an interactive messaging application 1767. In certain embodiments, this may be a standalone application that operates to manage communications with a server system, such as third-party servers or server system 108. In other embodiments, this functionality may be integrated with another application (e.g., messaging application 1762). The interactive messaging application 1767 may request and display various data related to messaging, media content, media collections, media overlays, and so forth, and may provide the capability for a user to input data related to the system via a touch interface, keyboard, or using a camera device of machine 1800, communication with a server system via I/O components 1150, and receipt and storage of object data in memory 1130. Presentation of information and user inputs associated with the information may be managed by the interactive messaging application 1767 using different frameworks 1708, library 1706 elements, or operating system 1704 elements operating on the machine 1800.

Figure 18:
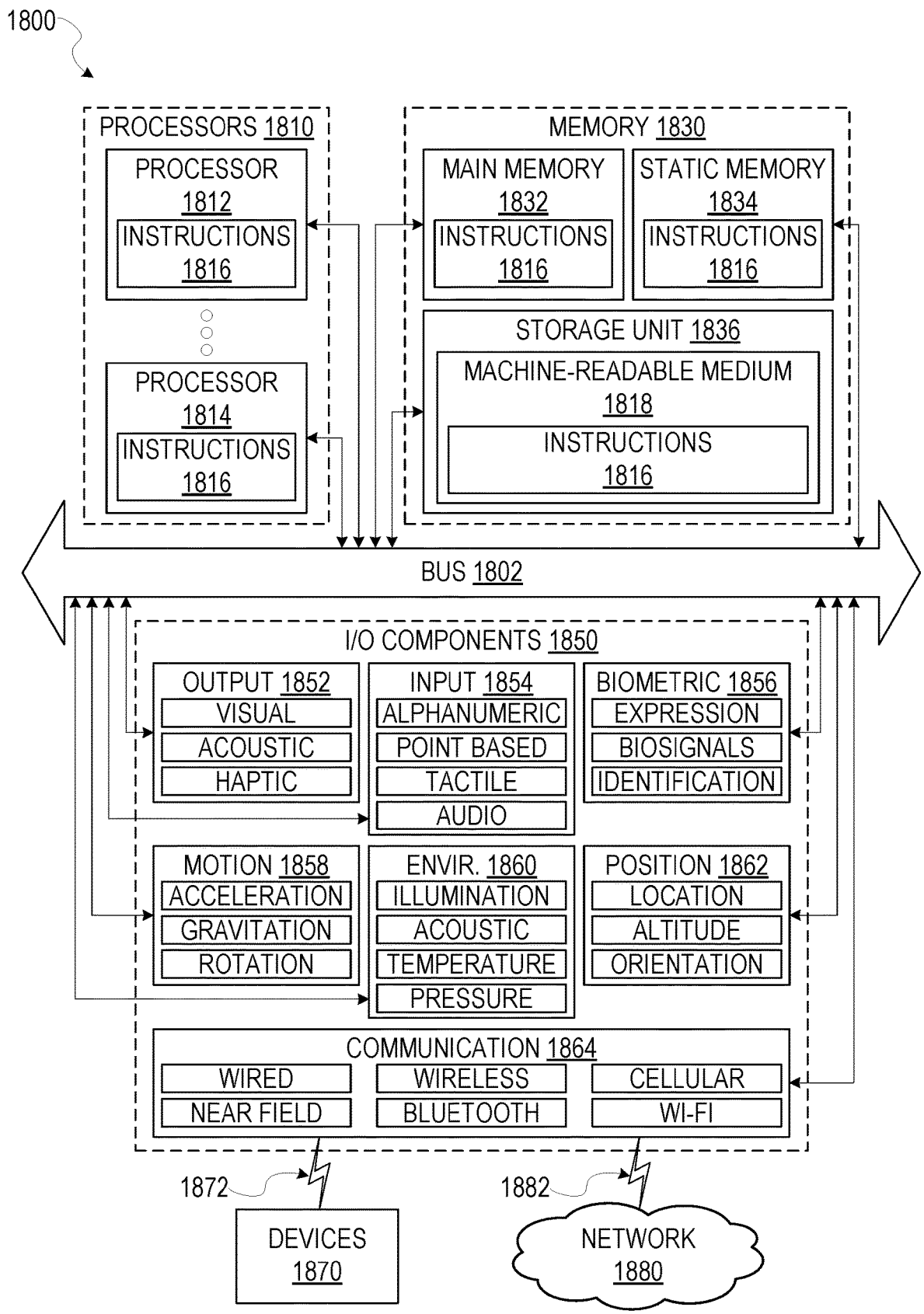
FIG. 18 illustrates a diagrammatic representation of a machine, in the form of a computer system, within which a set of instructions may be executed for causing the machine to perform any one or more of the methodologies discussed herein, according to an example embodiment.

FIG. 18 is a block diagram illustrating components of a machine 1800, according to some embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein can be executed. In alternative embodiments, the machine 1800 operates as a standalone device or can be coupled (e.g., networked) to other machines. In a networked deployment, the machine 1800 may operate in the capacity of a server machine 102, 112, 116, 118, 122, 124, and the like, or a client device 110 in a server-client network environment, or as a peer machine in a peer-to-peer (or distributed) network environment. The machine 1800 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

In various embodiments, the machine 1800 comprises processors 1810, memory 1830, and I/O components 1850, which can be configured to communicate with each other via a bus 1802. In an example embodiment, the processors 1810 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1812 and a processor 1814 that may execute the instructions 1816. The term "processor" is intended to include multi-core processors 1810 that may comprise two or more independent processors 1812, 1814 (also referred to as "cores") that can execute instructions 1816 contemporaneously. Although FIG. 18 shows multiple processors 1810, the machine 1800 may include a single processor 1810 with a single core, a single processor 1810 with multiple cores (e.g., a multi-core processor 1810), multiple processors 1812, 1814 with a single core, multiple processors 1812, 1814 with multiple cores, or any combination thereof.

The memory 1830 comprises a main memory 1832, a static memory 1834, and a storage unit 1836 accessible to the processors 1810 via the bus 1802, according to some embodiments. The storage unit 1836 can include a machine-readable medium 1818 on which are stored the instructions 1816 embodying any one or more of the methodologies or functions described herein. The instructions 1816 can also reside, completely or at least partially, within the main memory 1832, within the static memory 1834, within at least one of the processors 1810 (e.g., within the processor's cache memory), or any suitable combination thereof, during execution thereof by the machine 1800. Accordingly, in various embodiments, the main memory 1832, the static memory 1834, and the processors 1810 are considered machine-readable media 1818.

As used herein, the term "memory" refers to a machine-readable medium 1818 able to store data temporarily or permanently and may be taken to include, but not be limited to, random-access memory (RAM), read-only memory (ROM), buffer memory, flash memory, and cache memory. While the machine-readable medium 1818 is shown, in an example embodiment, to be a single medium, the term "machine-readable medium" should be taken to include a single medium or multiple media (e.g., a centralized or distributed database, or associated caches and servers) able to store the instructions 1816. The term "machine-readable medium" shall also be taken to include any medium, or combination of multiple media, that is capable of storing instructions (e.g., instructions 1816) for execution by a machine (e.g., machine 1800), such that the instructions 1816, when executed by one or more processors of the machine 1800 (e.g., processors 1810), cause the machine 1800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1850 include a wide variety of components to receive input, provide output, produce output, transmit information, exchange information, capture measurements, and so on. In general, it will be appreciated that the I/O components 1850 can include many other components that are not shown in FIG. 18. The I/O components 1850 are grouped according to functionality merely for simplifying the following discussion, and the grouping is in no way limiting. In various example embodiments, the I/O components 1850 include output components 1852 and input components 1854. The output components 1852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1854 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1850 include biometric components 1856, motion components 1858, environmental components 1860, or position components 1862, among a wide array of other components. For example, the biometric components 1856 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1858 include acceleration sensor components (e.g., accelerometer), gravitation sensor components, rotation sensor components (e.g., gyroscope), and so forth. The environmental components 1860 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1862 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 include a network interface component or another suitable device to interface with the network 1880. In further examples, communication components 1864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1870 may be another machine 1800 or any of a wide variety of peripheral devices (e.g., a peripheral device coupled via a Universal Serial Bus (USB)).

Moreover, in some embodiments, the communication components 1864 detect identifiers or include components operable to detect identifiers. For example, the communication components 1864 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1864, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1880 or a portion of the network 1880 may include a wireless or cellular network, and the coupling 1882 may be a Code Division Multiple Access (CDMA) connection, a Global System for Mobile communications (GSM) connection, or another type of cellular or wireless coupling. In this example, the coupling 1882 can implement any of a variety of types of data transfer technology, such as Single Carrier Radio Transmission Technology (1×RLTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1816 are transmitted or received over the network 1880 using a transmission medium via a network interface device (e.g., a network interface component included in the communication components 1864) and utilizing any one of a number of well-known transfer protocols (e.g., Hypertext Transfer Protocol (HTTP)). Similarly, in other example embodiments, the instructions 1816 are transmitted or received using a transmission medium via the coupling 1872 (e.g., a peer-to-peer coupling) to the devices 1870. The term "transmission medium" shall be taken to include any intangible medium that is capable of storing, encoding, or carrying the instructions 1816 for execution by the machine 1800, and includes digital or analog communications signals or other intangible media to facilitate communication of such software.

Furthermore, the machine-readable medium 1818 is non-transitory (in other words, not having any transitory signals) in that it does not embody a propagating signal. However, labeling the machine-readable medium 1818 "non-transitory" should not be construed to mean that the medium is incapable of movement; the medium 1818 should be considered as being transportable from one physical location to another. Additionally, since the machine-readable medium 1818 is tangible, the machine-readable medium 1818 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, by a first computing device associated with a first user, a message from a second computing device associated with a second user;
   determining, by the first computing device, that the message is an interactive message;
   displaying an indication that a new message has been received from the second user, in a graphical user interface comprising a message feed with a list of a plurality of users from which the first user has received messages or to which the first user has sent messages;
   receiving a selection to view the new message received from the second user;
   in response to receiving a selection to view the new message and determining that the message is an interactive message:
      causing the interactive message to be displayed;
      detecting a start time of the display of the interactive message; and
      after display of the interactive message, displaying an option to engage with the interactive message or to skip engagement;
   in response to receiving a selection to skip engagement, displaying the message feed with the list of the plurality of users and causing a selectable engagement indicium to be displayed next to a list entry of the second user in the list;
   determining that a predetermined amount of time has elapsed since the start time of the display of the interactive message without engagement with the interactive message; and
   causing the interactive message to be deleted from the message feed and the selectable engagement indicium removed from next to the list entry of the second user.

2. The method of claim 1, wherein the interactive message is a first interactive message and further comprising:
   before determining that the predetermined amount of time has elapsed since the start time of the display of the interactive message, detecting a selection of the selectable engagement indicium next to the list entry of the second user in the list;
   displaying an option to engage with the interactive message;
   receiving a selection of the option to engage with the interactive message;
   generating a second interactive message corresponding to the first interactive message;
   causing the second interactive message to be sent to the second computing device associated with the second user; and
   causing the first interactive message to be deleted from the message feed and the selectable engagement indicium removed from next to the list entry of the second user.

3. The method of claim 2, wherein generating the second interactive message comprises:
   capturing an image or video via a camera of the first computing device; and
   adding the image or video to the first interactive message to generate the second interactive message.

4. The method of claim 2, wherein generating the second interactive message comprises receiving an input for a game play and generating the second interactive message using the input for the game play.

5. The method of claim 1, wherein the message is a first message and further comprising:
   receiving a second message from the second user;
   displaying an indication that a new message has been received from the second user in the graphical user interface comprising the message feed with the list of the plurality of users from whom the first user has received messages or to whom the first user has sent messages; and
   removing the removing the selectable engagement indicium from being displayed next to the list entry of the second user.

6. The method of claim 1, wherein in response to receiving the selection to skip engagement, further displaying a selection with the list entry of the second user to view the interactive message again.

7. The method of claim 1, further comprising:
during a display in a camera view on the first computing device, causing display of indicia of a plurality of interactive messages available for engagement;
after receiving the interactive message from the second computing device, causing display of an indicium corresponding to the interactive message received from the second computing device in the display of indicia of interactive messages available for engagement; and
causing the indicium corresponding to the interactive message received from the second computing device to be removed from the display of indicia of interactive messages available for engagement upon determination that a predetermined amount of time has elapsed since the start time of the display of the interactive message without engagement with the interactive message.

8. The method of claim 7, wherein the indicium corresponding to the interactive message received from the second computing device comprises an indicator corresponding to a number of active sessions for the interactive message.

9. The method of claim 1, further comprising:
during a display in a camera view on the first computing device, causing display of indicia of a plurality of interactive messages available for engagement, the plurality of interactive messages including an indicium corresponding to the interactive message received from the second computing device; and
after receiving the interactive message from the second computing device, causing display of an indicator on the indicium corresponding to the interactive message received from the second computing device, the indicator corresponding to a number of active sessions for the interactive message.

10. The method of claim 9, further comprising:
increasing the number of active sessions for the interactive message and updating the indicator based on detecting engagement with the interactive message received from the second computing device.

11. A computing device comprising:
one or more hardware processors; and
a computer-readable medium coupled with the one or more hardware processors, the computer-readable medium comprising instructions stored thereon that are executable by the one or more hardware processors to cause the computing device to perform operations comprising:
receiving a message from a second computing device associated with a second user, wherein the computing device is a first computing device associated with a first user;
determining that the message is an interactive message;
displaying an indication that a new message has been received from the second user, in a graphical user interface comprising a message feed with a list of a plurality of users from which the first user has received messages or to which the first user has sent messages;
receiving a selection to view the new message received from the second user;
in response to receiving a selection to view the new message and determining that the message is an interactive message:
causing the interactive message to be displayed;
detecting a start time of the display of the interactive message; and
after display of the interactive message, displaying an option to engage with the interactive message or to skip engagement;
in response to receiving a selection to skip engagement, displaying the message feed with the list of the plurality of users and causing a selectable engagement indicium to be displayed next to a list entry of the second user in the list;
determining that a predetermined amount of time has elapsed since the start time of the display of the interactive message without engagement with the interactive message; and
causing the interactive message to be deleted from the message feed and the selectable engagement indicium removed from next to the list entry of the second user.

12. The computing device of claim 11, wherein the interactive message is a first interactive message and the operations further comprise:
before determining that the predetermined amount of time has elapsed since the start time of the display of the interactive message, detecting a selection of the selectable engagement indicium next to the list entry of the second user in the list;
displaying an option to engage with the interactive message;
receiving a selection of the option to engage with the interactive message;
generating a second interactive message corresponding to the first interactive message;
causing the second interactive message to be sent to the second computing device associated with the second user; and
causing the first interactive message to be deleted from the message feed and the selectable engagement indicium removed from next to the list entry of the second user.

13. The computing device of claim 12, wherein generating the second interactive message comprises:
capturing an image or video via a camera of the first computing device; and
adding the image or video to the first interactive message to generate the second interactive message.

14. The computing device of claim 12, wherein generating the second interactive message comprises receiving an input for a game play and generating the second interactive message using the input for the game play.

15. The computing device of claim 11, wherein the message is a first message and the operations further comprise:
receiving a second message from the second user;
displaying an indication that a new message has been received from the second user in the graphical user interface comprising the message feed with the list of the plurality of users from whom the first user has received messages or to whom the first user has sent messages; and
removing the removing the selectable engagement indicium from being displayed next to the list entry of the second user.

16. The computing device of claim 11, the operations further comprising:
during a display in a camera view on the first computing device, causing display of indicia of a plurality of interactive messages available for engagement;

after receiving the interactive message from the second computing device, causing display of an indicium corresponding to the interactive message received from the second computing device in the display of indicia of interactive messages available for engagement; and causing the indicium corresponding to the interactive message received from the second computing device to be removed from the display of indicia of interactive messages available for engagement upon determination that a predetermined amount of time has elapsed since the start time of the display of the interactive message without engagement with the interactive message.

17. The computing device of claim 16, wherein the indicium corresponding to the interactive message received from the second computing device comprises an indicator corresponding to a number of active sessions for the interactive message.

18. The computing device of claim 11, the operations further comprising:

during a display in a camera view on the first computing device, causing display of indicia of a plurality of interactive messages available for engagement, the plurality of interactive messages including an indicium corresponding to the interactive message received from the second computing device; and after receiving the interactive message from the second computing device, causing display of an indicator on the indicium corresponding to the interactive message received from the second computing device, the indicator corresponding to a number of active sessions for the interactive message.

19. The computing device of claim 18, the operations further comprising:

increasing the number of active sessions for the interactive message and updating the indicator based on detecting engagement with the interactive message received from the second computing device.

20. A non-transitory computer-readable medium comprising instructions stored thereon that are executable by at least one processor to cause a computing device to perform operations comprising:

receiving a message from a second computing device associated with a second user, wherein the computing device is a first computing device associated with a first user;

determining that the message is an interactive message;

displaying an indication that a new message has been received from the second user, in a graphical user interface comprising a message feed with a list of a plurality of users from which the first user has received messages or to which the first user has sent messages;

receiving a selection to view the new message received from the second user;

in response to receiving a selection to view the new message and determining that the message is an interactive message:

causing the interactive message to be displayed;

detecting a start time of the display of the interactive message; and after display of the interactive message, displaying an option to engage with the interactive message or to skip engagement;

in response to receiving a selection to skip engagement, displaying the message feed with the list of the plurality of users and causing a selectable engagement indicium to be displayed next to a list entry of the second user in the list;

determining that a predetermined amount of time has elapsed since the start time of the display of the interactive message without engagement with the interactive message; and causing the interactive message to be deleted from the message feed and the selectable engagement indicium removed from next to the list entry of the second user.

* * * * *

UNITED STATES PATENT AND TRADEMARK OFFICE
CERTIFICATE OF CORRECTION

| | |
|---|---|
| PATENT NO. | : 11,265,274 B1 |
| APPLICATION NO. | : 16/804774 |
| DATED | : March 1, 2022 |
| INVENTOR(S) | : Anvaripour et al. |

It is certified that error appears in the above-identified patent and that said Letters Patent is hereby corrected as shown below:

In the Claims

In Column 28, Line 65, in Claim 5, delete "removing the removing the" and insert --removing the-- therefor In Column 30, Line 60, in Claim 15, delete "removing the removing the" and insert --removing the-- therefor Signed and Sealed this
Tenth Day of May, 2022

*Katherine Kelly Vidal*

Katherine Kelly Vidal
*Director of the United States Patent and Trademark Office*